(12) United States Patent
Tamura et al.

(10) Patent No.: US 6,417,856 B1
(45) Date of Patent: Jul. 9, 2002

(54) IMAGE GENERATION DEVICE AND INFORMATION STORAGE MEDIUM

(75) Inventors: Toshiaki Tamura; Kiyotake Fujii; Jun Omura, all of Yokohama (JP)

(73) Assignee: Namco Ltd., Tokyo (JP)

( * ) Notice: Subject to any disclaimer, the term of this patent is extended or adjusted under 35 U.S.C. 154(b) by 0 days.

(21) Appl. No.: 09/328,460

(22) Filed: Jun. 9, 1999

(30) Foreign Application Priority Data

Jun. 11, 1998 (JP) .......................................... 10-179651

(51) Int. Cl.$^7$ .............................................. G06T 17/00
(52) U.S. Cl. ...................................................... 345/474
(58) Field of Search ................................ 345/473, 474, 345/761, 955–960

(56) References Cited

U.S. PATENT DOCUMENTS 6,010,403 A * 1/2000 Adam et al. .................... 463/6
6,124,862 A * 9/2000 Boyken et al. ............. 345/435

FOREIGN PATENT DOCUMENTS

| JP | A-6-507736 | 9/1994 |
| JP | A 7-116343 | 5/1995 |
| JP | A 8-117440 | 5/1996 |
| JP | A 8-224374 | 9/1996 |
| JP | A 8-276770 | 10/1996 |
| JP | A 9-140935 | 6/1997 |
| JP | A 9-167256 | 6/1997 |
| JP | A 9-299612 | 11/1997 |
| JP | A 9-325684 | 12/1997 |
| JP | A 10-94676 | 4/1998 |
| WO | WO 92/16924 | 10/1992 |

* cited by examiner

*Primary Examiner*—Almis R. Jankus
(74) *Attorney, Agent, or Firm*—Oliff & Berridge, PLC

(57) ABSTRACT

Viewpoint settings (e.g., viewpoint change pattern, viewpoint position, line-of-sight, angle of view, spring constant or viewpoint control program) are provided for moving bodies. From these viewpoint settings, a viewpoint setting linked to the moving body selected by a player is selected. The selected viewpoint setting is then used to control the viewpoint. For example, when a player selects one of motor vehicles of types 1, 2 and 3, the viewpoint is changed according to one of viewpoint change patterns that include viewpoint groups (1-A, 1-B), (2-A, 2-B) and (3-A, 3-B), depending au the selected type of the motor vehicle. The height of the viewpoint may be changed in proportion to the height of the moving body. The distance between th viewpoint and the moving body may be changed in proportion to the length of the moving body. The viewpoint may be located in the right front of a motor vehicle with a right-hand steering wheel, and in the left front of a motor vehicle with a left-hand steering wheel. For a first moving body, a viewpoint control program that permits the viewpoint position or line-of-sight to follow the slight change in the position or direction of the first moving body may be used; and for a second moving body, another viewpoint control program that inhibits the viewpoint position or line-of-sight from following the slight change in the position or direction of the second moving body may he used.

31 Claims, 16 Drawing Sheets

FIG. 5
MOTOR VEHICLE TYPE 1 SELECTED
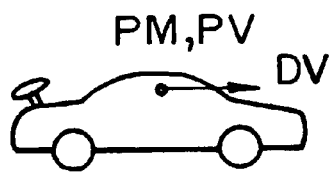
MOTOR VEHICLE TYPE 2 SELECTED
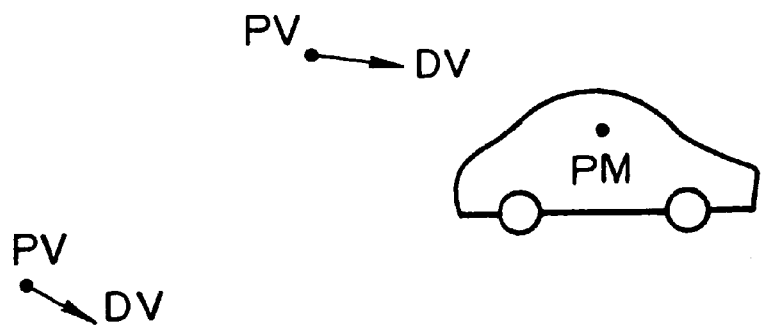
MOTOR VEHICLE TYPE 3 SELECTED
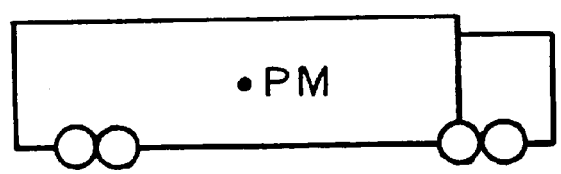

REDUCED ANGLE OF VIEW

INCREASED ANGLE OF VIEW

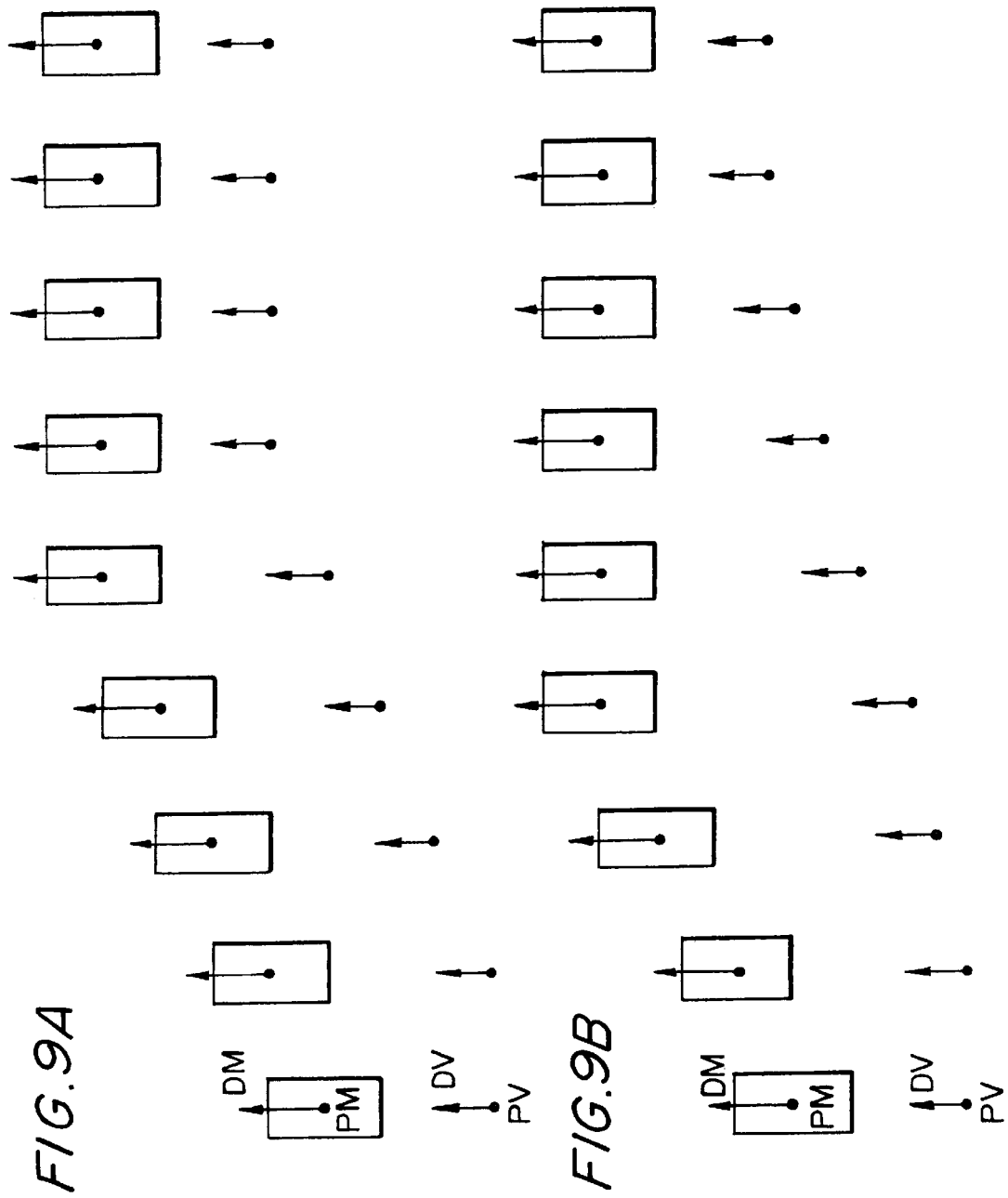

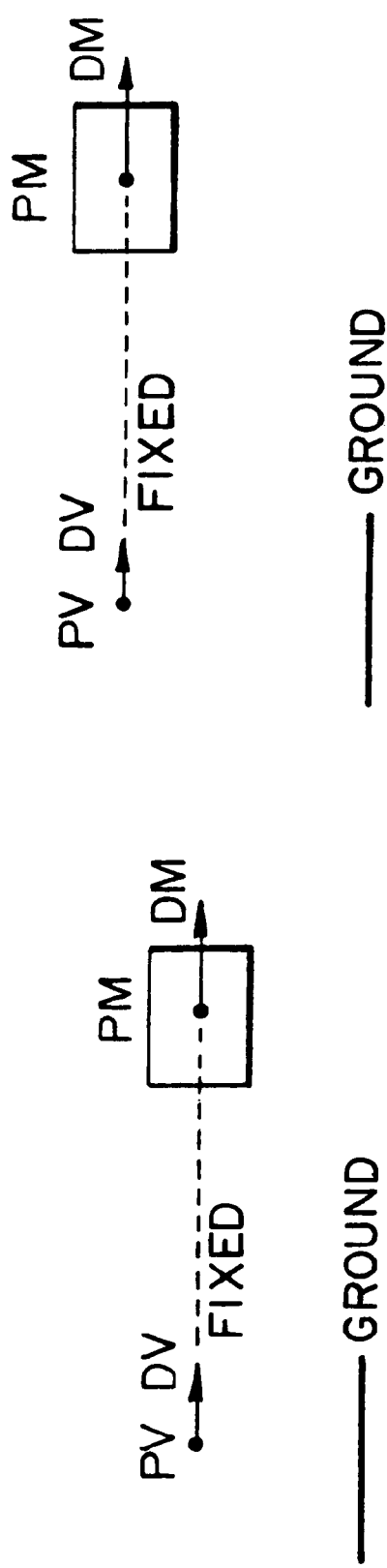
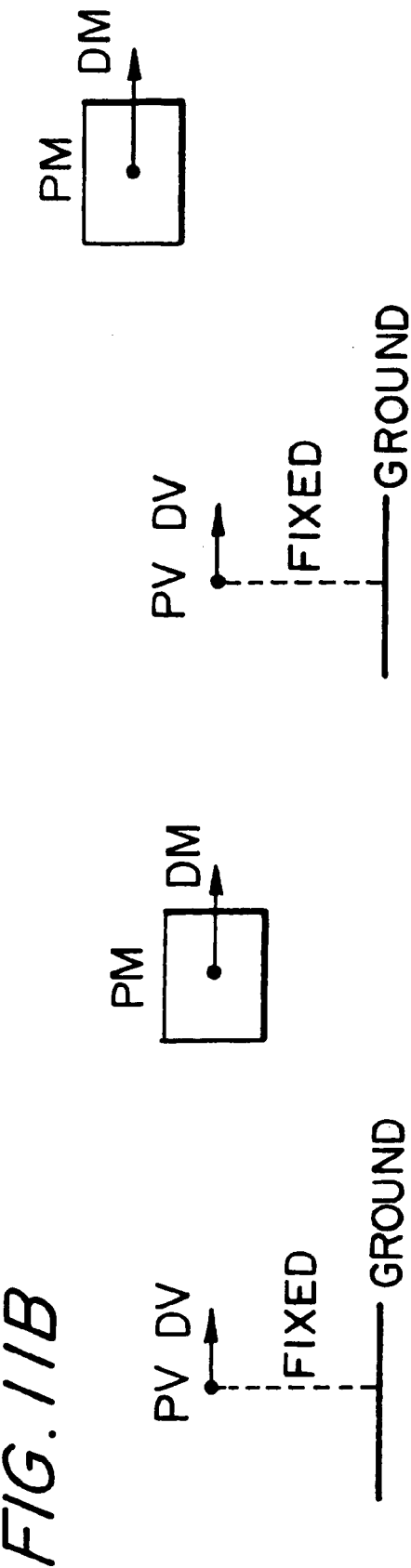
FIG. 11A
FIG. 11B

IMAGE GENERATION DEVICE AND INFORMATION STORAGE MEDIUM

BACKGROUND OF THE INVENTION

1. Field of the Invention

The present invention relates to an image generation device for generating an image viewed from a given viewpoint in an object space and to an information storage medium usable therein.

2. Description of the Prior Art

Image generation devices have been developed and used which are designed to form a plurality of objects within a virtual three-dimensional object space and to generate an image viewed from a given viewpoint in the object space. These image generation devices are highly popular since a player can experience a so-called virtual reality. In an image generation device by which a player can enjoy a racing game, for example, the player can control a motor vehicle running in an object space and enjoy a three-dimensional game by competing against other motor vehicles controlled by the other players or by a computer.

In the development of such an image generation device, efficient control of the viewpoint is one of the important technical objectives. An example of techniques for controlling the viewpoint is disclosed in Japanese Patent Application Laid-Open No. 7-116343, for example. In this technique, a player depresses a viewpoint change button on a control panel to perform a "viewpoint change". More particularly, the player can change the viewpoint from the first-person viewpoint (in which a moving body controlled by a player is not displayed on the screen) to the third-person viewpoint (in which the moving body controlled by the player is displayed on the screen) or vice versa.

In the conventional techniques, however, various conditions for the viewpoint setting (viewpoint change pattern, position of the viewpoint, line-of-sight and so on) were determined regardless of the type of moving body selected by the player. In other words, images were always generated based on a given viewpoint setting. Therefore, the player could not get a viewpoint setting that is suitable for the selected moving body.

In addition, the viewpoint setting in the conventional techniques was necessarily directed for all players including advanced players and beginners, leading to the dissatisfaction of advanced players due to poor reality or appeal, or the dissatisfaction of beginners due to difficulty of the game.

SUMMARY OF THE INVENTION

It is therefore an object of the present invention to provide an image generation device enabling an optimal viewpoint setting that is suitable for the type of selected moving body and also to provide an information storage medium usable therein.

To this end, the present invention provides an image generation device for generating an image viewed from a given viewpoint in an object space, comprising: means for selecting a moving body operated by a player from a plurality of moving bodies; means for selecting a viewpoint setting that is linked to the selected moving body from a plurality of viewpoint settings provided for the plurality of moving bodies and for controlling the viewpoint based on the selected viewpoint setting; and means for generating an image viewed from the viewpoint that is controlled based on the selected viewpoint setting.

According to the present invention, a plurality of viewpoint settings are provided for a plurality of moving bodies. When a player selects one of the moving bodies, a viewpoint setting that is linked to (suitable for) the selected moving body is also selected. Thus, the viewpoint is controlled based on the selected viewpoint setting and an image viewed from the controlled viewpoint will be generated. Therefore, the viewpoint setting can be changed from one to another depending on the selected moving body. As a result, an optimum viewpoint setting that is suitable for the type of moving body can be obtained. This also leads to an increased variety in the viewpoint setting without requiring any complicated operation to the player.

The viewpoint setting may include setting of a viewpoint change pattern; a viewpoint change pattern that is linked to the selected moving body may be selected from a plurality of viewpoint change patterns provided for the plurality of moving bodies; and the viewpoint may be changed according to the selected viewpoint change pattern. For example, a first viewpoint change pattern (1-A, 1-B, 1-C) may be provided for a first moving body, and a second viewpoint change pattern (2-A, 2-B, 2-C) may be provided for a second moving body, as a viewpoint setting. If the player selects the first moving body, the viewpoint can be changed from 1-A to 1-C. If the player selects the second moving body, the viewpoint can be changed from 2-A to 2-C. In such a manner, the variety in changing the viewpoint can be increased without requiring any complicated operation to the player. This can meet many players ranging from the advanced players to beginners.

The viewpoint setting may include setting of at least one of the viewpoint position, line-of-sight and angle of view. By changing the viewpoint position, line-of-sight or angle of view depending on the type of moving body, an optimum viewpoint setting that is suitable for the type, height, length, magnitude, shape, running performance, capability, property and so on of the selected moving body can be obtained.

The height of the viewpoint may be increased in proportion as the height of the moving body is increased. Thus, an image viewed from the optimum viewpoint that is changed depending on the height of the moving body can be provided.

The distance between the moving body and the viewpoint may be increased in proportion as the length of the moving body increased. Thus, an image viewed from the optimism viewpoint that is changed depending on the length of the moving body can be provided.

A first moving body among the plurality of the moving bodies may have a viewpoint in the right front of the first moving body; and a second moving body among the plurality of the moving bodies may have a viewpoint in the left front of the second moving body. This makes it possible to give a player a feeling as if he or she drives a motor vehicle with a right-hand steering wheel or a motor vehicle with a left-hand steering wheel, for example.

The viewpoint setting may include setting of a viewpoint control program; a viewpoint control program that is linked to the selected moving body may be selected from a plurality of viewpoint control programs provided for the plurality of moving bodies; and the viewpoint may be controlled according to the selected viewpoint control program. This makes it possible to control the viewpoint according to the option viewpoint control program that is suitable for the selected moving body. As a result, the variety in control of viewpoint can be increased without using any complicated viewpoint control program.

A first viewpoint control program for the first moving body among the plurality of moving bodies may permit the viewpoint position or line-of-sight to follow the slight change in the position or direction of the first moving body; and a second viewpoint control program for the second moving body among the plurality of the moving bodies may inhibit the viewpoint position or line-of-sight from following the slight change in the position or direction of the second moving body. If the player selects the first moving body, thus, the first viewpoint control program can be selected so as to generate an image in which slight movement does not occur in the first moving body but occurs in the background. On the other hand, if the player selects the second moving body, the second viewpoint control program can be selected so as to generate an image in which slight movement does not occur in the background but occurs in the second moving body. Therefore, the viewpoint can be controlled meeting many players ranging from advanced players to beginners without need of any complicated viewpoint control program.

BRIEF DESCRIPTION OF THE DRAWINGS

FIG. 5 illustrates a method in which different viewpoint position and line-of-sight are applied depending on the type of selected moving body.

FIGS. 6A, 6C, 6C and 60 illustrate a method in which a different viewpoint position is applied depending on the height or length of the selected moving body.

FIGS. 9A and 9B illustrate a method in which a different spring constant is applied depending on the type of selected moving body.

FIGS. 11A and 11B illustrate a method in which a different viewpoint control program is applied depending on the type of selected moving body.

DETAILED DESCRIPTION OF THE PREFERRED EMBODIMENTS

The present invention will now be described by way of example with reference to the drawings. Although the present invention will mainly be described in connection with a racing game, it is to be understood that the present invention can similarly be applied to any of the other games.

Figure 1:
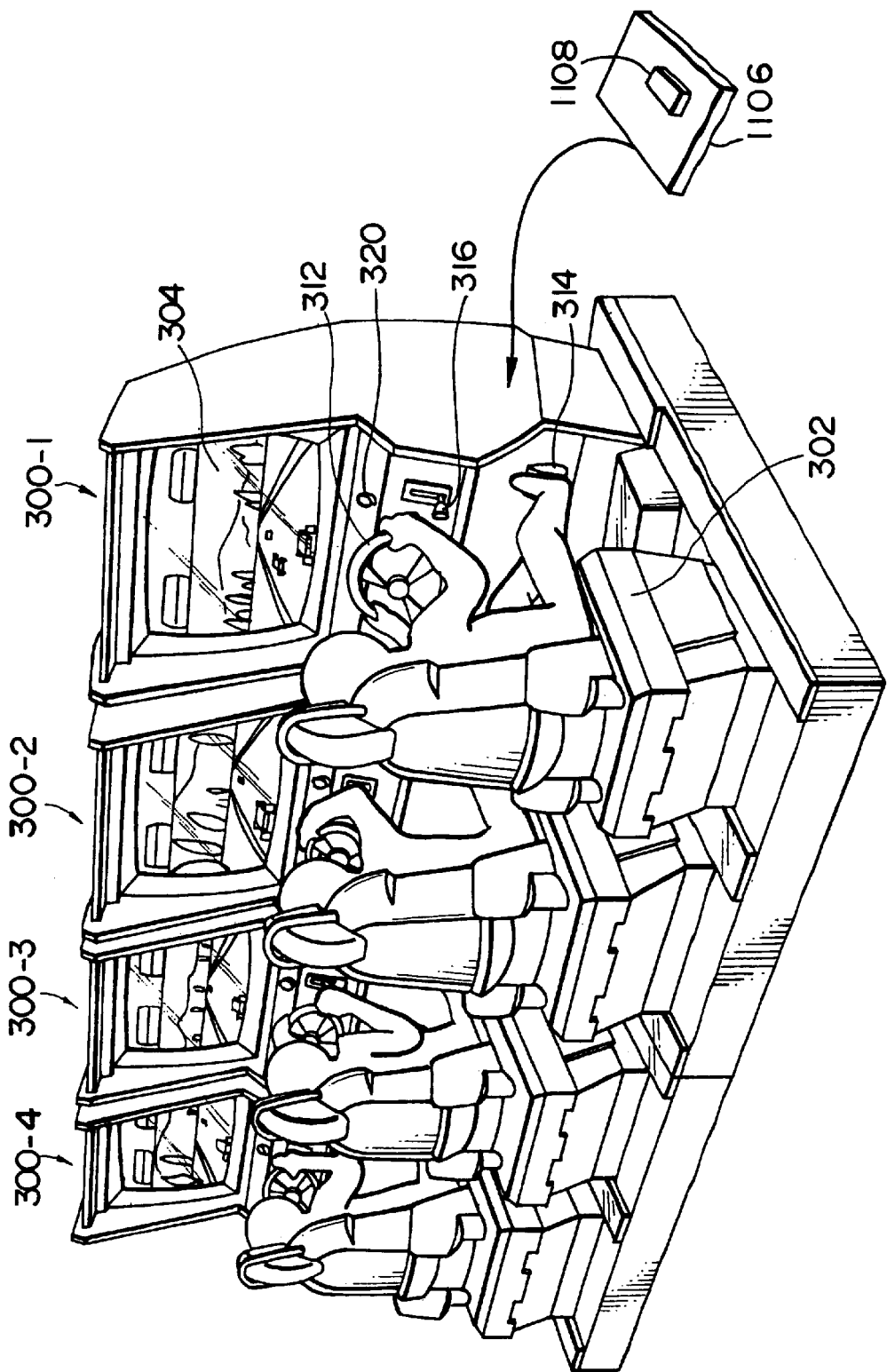
FIG. 1 illustrates the external appearance of an image generation device according to one embodiment of the present invention.

FIG. 1 illustrates the external appearance of an arcade game apparatus to which the embodiment of the image generation device of the present invention is applied.

Referring to FIG. 1, a plurality of game machines 300-1, 300-2, 300-3 and 300-4 are interconnected through a data transmission line, for example. These game machines provide a racing game in which a motor vehicle controlled by the player competes with other motor vehicles controlled by other players or a counter.

As shown in FIG. 1, each of the game machines has a driver's seat similar to that of an actual motor vehicle. Each of the players on a seat 302 plays the game by driving a virtual motor vehicle (within an object space) using a steering wheel 312, an accelerator pedal 314, a shift lever 316 and a braking pedal (now shown) while viewing a game image on a display 304. When the player depresses a viewpoint change button 320, he or she can see a game image viewed from a desired viewpoint.

Although FIG. 1 shows a multi-player type game to which the present invention is applied, it is to be understood that the present invention may similarly be applied to a single-player type game.

Figure 2:
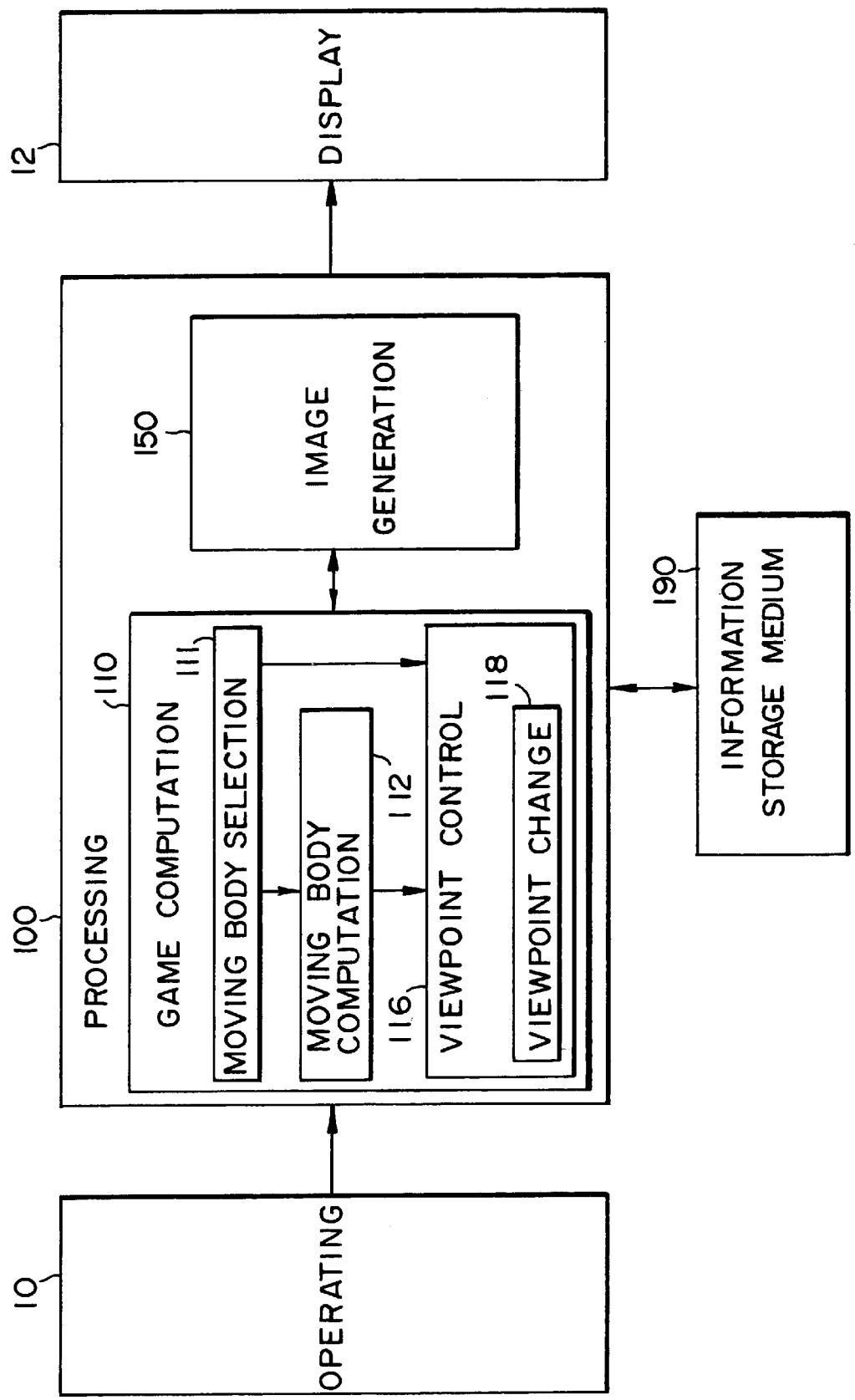
FIG. 2 is a functional block diagram of an image generation device according to the embodiment of the present invention.

FIG. 2 shows an example of a functional block diagram of the embodiment of an image generation device according to the present invention.

An operating section 10 corresponding to the steering wheel 312, accelerator 314 and so on shown in FIG. 1 is used to input operational data. The operational data inputted from the operating section 10 is transmitted to a processing section 100.

The processing section 100 performs various processings such as disposing objects within the object space and generating an image viewed from a given viewpoint within the object space, based on the operational data and a given program. The function of this processing section 100 can be realized by hardware such as CPU (CISC or RISC type), DSP, ASIC (gate array and so on) or memory.

An information storage medium 190 stores a program and data. The function of this information storage medium 190 can be realized by hardware such as CD-ROM, game cassette, IC card, MO, FD, DVD, HDD or memory. The processing section 100 performs various processings based on the program and data from the information storage medium 190.

The processing section 100 comprises a game computation section 110 and an image generation section 150.

The game computation section 110 performs various processings required during the game, such as setting of the game mode, moving the game forward, determining the position and direction of the moving body, determining viewpoint position and line-of-sight (viewing direction), and disposing objects within the object space.

The image generation section 150 generates an image viewed from a given viewpoint within the object space set by the game computation section 100. The image generated by the image generation section 150 is displayed on a display 12.

The game computation section 110 comprises a moving body selection section 111, a moving body computation section 112 and a viewpoint control section 116.

Figure 3:
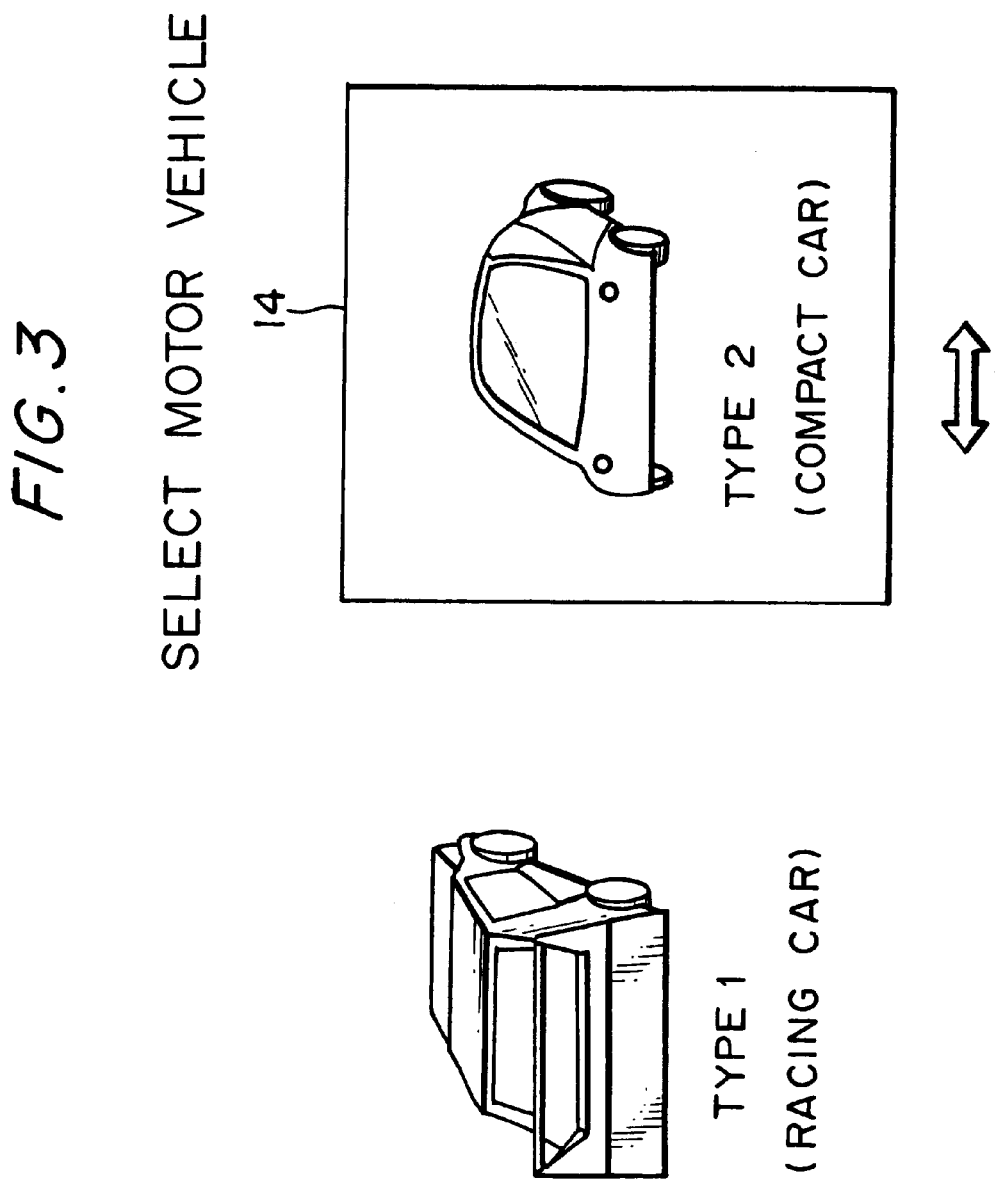
FIG. 3 illustrates an example of an image that is displayed when a player selects a moving body.

The moving body selection section 111 performs various proceedings for the player selecting one moving body from a plurality of moving bodies, such as a processing for displaying a motor vehicle selection image as shown in FIG. 3.

The moving body computation section 112 performs computation for moving the moving bodies controlled by the player and a given control program of the computer within the object space, based on the operational data from the operating section 10 and a given program. For example, it can perform a computation for determining the position and direction of the moving body for each frame (1/60 seconds).

For example, the position $PM_k$ and speed $VM_k$ of a moving body in a frame k can be determined by the following equations (1) and (2):

$$PM_k = PM_{k-1} + VM_{k-1} \times \Delta t \quad (1)$$

$$VM_k = VM_{k-1} + AM_{k-1} \times \Delta t \quad (2)$$

where: $PM_{k-1}$=position of a moving body in a frame (k−1); $VM_{k-1}$=speed of a moving body in a frame (k−1); $AM_{k-1}$=acceleration of a moving body in a frame (k−1); and $\Delta t$=time of one frame.

The viewpoint control section 116 performs various processings for determining the viewpoint position, line-of-sight and so on based on the position or direction data of a moving body obtained by the moving body computation section 112. More particularly, it can perform, for example, processings for moving the viewpoint so that the viewpoint follows the moving body controlled by the player. In such a case, it is preferable that the viewpoint follows the moving body with an inertia, for example. The image generation section 150 will generate an image viewed from this viewpoint controlled by the viewpoint control section 116.

The viewpoint control section 116 includes a viewpoint change section 118 which performs various processings for changing the viewpoint based on the operational data from the operating section 10. More particularly, as each player depresses a viewpoint change button 320, the viewpoint is changed from one to another according to the operational data from the viewpoint change button 320 as well as the viewpoint change patterns which will be described later.

The features of this embodiment are as follows. A plurality of settings for the viewpoint are provided for a plurality of moving bodies. As a player selects a desired moving body from a plurality of moving bodies (motor vehicle), the viewpoint control section 116 then selects a viewpoint setting depending on the type of the selected moving body and controls the viewpoint based on the selected viewpoint setting. Thus, the viewpoint that is suitable for the selected moving body can be optimally set.

Various conditions for the viewpoint setting in this embodiment may include a viewpoint change pattern, viewpoint position (relative position of the viewpoint to the moving body, for example), line-of-sight (relative viewing direction to the direction of the moving body, for example), angle of view, a viewpoint control program and so on.

First of all, a case where the viewpoint setting includes setting of a viewpoint change pattern will be described. In such a case, a plurality of viewpoint change patterns are provided for a plurality of moving bodies. The viewpoint will be changed according to a viewpoint change pattern that is changed depending on the type of selected moving body.

More particularly, each player selects a moving body (motor vehicle) through ouch a selection image as shown in FIG. 3, for example. FIG. 3 shows three types of motor vehicles selectable by each player, that is, a racing car (type 1), a compact car (type 2) and a truck (type 3). Each player selects a desired motor vehicle by turning the steering wheel 312 of FIG. 1 to move a cursor 14 and fixes the selection by stepping on the accelerator pedal 314.

Figure 4:
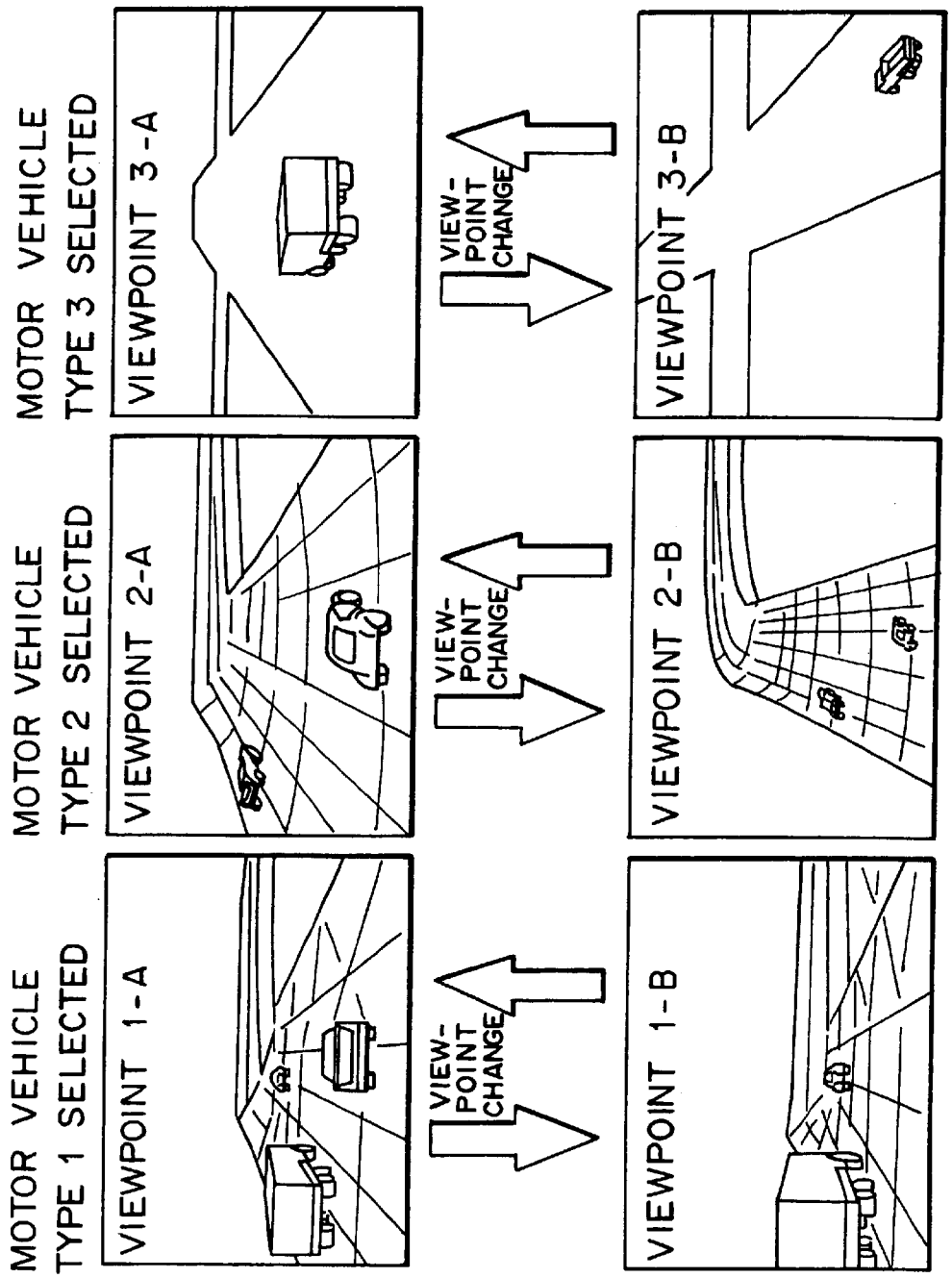
FIG. 4 illustrates a method in which a different viewpoint change pattern is applied depending on the type of selected moving body.

In this embodiment, a viewpoint change pattern is changed depending on the type of motor vehicle, as shown in FIG. 4. More particularly, viewpoint change patterns (1-A, 1-B), (2-A, 2-B) and (3-A, 3-B) are provided for the motor vehicles of types 1, 2 and 3, respectively.

If the player selects the motor vehicle of type 1, the viewpoint change pattern (1-A, 1-B) is selected. When the player depresses the viewpoint change button 320 of FIG. 1, the viewpoint is changed from 1-A to 1-B, as shown in FIG. 4. As the player again depresses the viewpoint change button 320, the viewpoint is further changed from 1-B to 1-A.

If the player selects the motor vehicle of type 2, the viewpoint change pattern (2-A, 2-B) is selected. When the player depresses the viewpoint change button 320, the viewpoint is changed from 2-A to 2-B. As the player again depresses the viewpoint change button 320, the viewpoint is further changed from 2-B to 2-A. If the player selects the motor vehicle of type 3, the viewpoint change pattern (3-A, 3-B) in selected. When the player depresses the viewpoint change button 320, the viewpoint is changed from 3-A to 3-B. As the player again depresses the viewpoint change button 320, the viewpoint is further changed from 3-B to 3-A.

FIG. 4, the viewpoints 1-A, 2-A and 3-A are usual third-person's viewpoints.

On the other hand, the viewpoint 1-B is a first-person's viewpoint (cockpit or driver viewpoint). By using this viewpoint 1-B, the player can virtually experience a realistic driving feel in comparison with the viewpoint 1-A. But on the other hand, it becomes difficult to know the surrounding conditions. This increases the degree of difficulty in the game play.

The viewpoint 2-B is a third-person's viewpoint as the viewpoint 2-A is, but 2-B is at a position remote from the player's motor vehicle (which is controlled by the player). The viewpoint 2-B can provide the player with the surrounding conditions more easily than the viewpoint 2-A. However, the reality is reduced.

The viewpoint 3-B is a third-person's viewpoint as the viewpoint 3-A is, but 3-B is at an upper left position remote from the player's motor vehicle. The viewpoint 3-B can provide the player with the conditions of the left side of the player's motor vehicle (e.g., conditions of other motor vehicles running on the left side of the player's motor vehicle) more easily than the viewpoint 3-A. However, driving becomes difficult since the position of the player's motor vehicle is offset from the center of the screen.

According to this embodiment, the viewpoint change pattern can be changed depending on the type of motor vehicle (or moving body) selected by the player. Therefore, an optimum viewpoint change pattern that is suitable for the type of the motor vehicle can be set.

A player who selects a racing car (type 1) can be generally supposed to be an advanced player who has a good game skill and wishes a realistic driving feel. The wish can be satisfied by providing the viewpoint change pattern (1-A, 1-B) as shown in FIG. 4.

A player who selects a compact car (type 2) can be generally supposed to be a beginner who wishes a game play with a reduced difficulty rather than a realistic driving feel. The wish can be satisfied by providing the viewpoint change pattern (2-A, 2-B).

A player who selects a truck (type 3) can be given an unusual driving feel by providing the viewpoint change pattern (3-A, 3-B). Thus, the variety of the viewpoint setting can be increased.

There is another technique of increasing the variety of the viewpoint setting. In this technique, only one viewpoint change pattern is provided, but it contains various types of viewpoints (e.g., 1-A, 1-B, 2-B and 3-B) (see Japanese Patent Application Laid-Open No. 7-116343). The viewpoint is always selected from this one viewpoint change pattern (1-A, 1-B, 2-B, 3-B) regardless of the type of the motor vehicle selected by the player. In this technique, however, the player has to actuate the viewpoint change button 320 three times if the player wants to change the viewpoint from 1-A to 3-B, for example. Thus, the operation to be performed by the player will be very troublesome. Particularly, when the player is driving the motor vehicle in the game play, such a troublesome operation may confuse the player and prevent the player from enjoying the game.

In order to prevent such a troublesome operation, if the viewpoint change pattern contains only viewpoints for an advanced player (e.g., 1-A and 1-B), the wish of the advanced players is satisfied, but not the wishes of all types of players.

In this embodiment, on the contrary, the variety of the viewpoint setting can be increased and the wishes of all types of players ranging from advanced players to beginners can be satisfied by providing different viewpoint change patterns for various types of motor vehicle.

Although the above description concerns an example where the viewpoint setting includes setting of the viewpoint change pattern that is changed depending on the type of moving body, as shown in FIG. 4, the viewpoint setting in this embodiment is not limited thereto. As shown in FIG. 5, the viewpoint setting may include setting of the viewpoint position or the line-of-sight, for example.

If a player selects the motor vehicle of type 1 (racing car), a first-person's viewpoint is provided in which the position of viewpoint PV substantially coincides with the position of motor vehicle PM, as show in FIG. 5. Thus, the player can enjoy the game while viewing a realistic game image.

If a player selects the motor vehicle of type 2 (compact car), a third-person's veiwpoint is provided in which the position of viewpoint PV is located in the rearward of the motor vehicle and the line-of-sight DV is directed slightly downward. Thus, the player can enjoy the game while viewing a game image with ease but a reduced reality.

If a player selects the motor vehicle of type 3 (truck), a third-person's viewpoint is provided in which the position of viewpoint PV is located in the rearward of the motor vehicle, further than the viewpoint for the motor vehicle of type 2, and the line-of-sight DV is directed downward, further than the line-of-sight for the motor vehicle of type 2. Thus, the player can enjoy the game while viewing a game image with more ease.

In such a manner, the optimum viewpoint setting that is suitable for the type of selected motor vehicle can be realized without providing a viewpoint change button in an image generation device.

When it is wanted to change the veiwpoint setting depending on the type of motor vehicle, it is desirable to set the viewpoint position or the line-of-sight as described below.

Figure 6A:
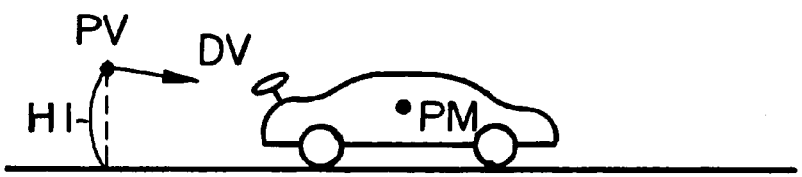
Figure 6B:
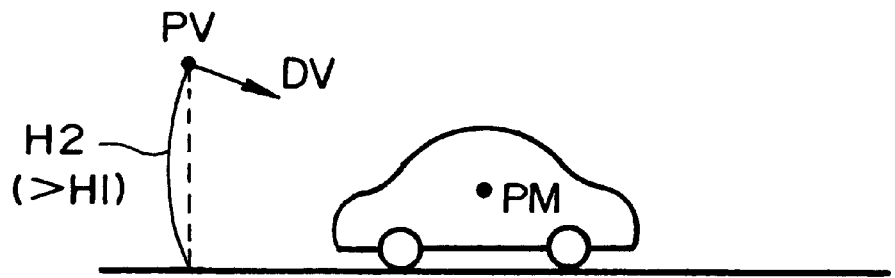

First, the height of the viewpoint is increased in proportion as the height of the motor vehicle is increased. As shown in FIGS. 6A and 6B, the height H1 of the viewpoint PV is low because the height of the motor vehicle of FIG. 6A is low, and the height H2 of the veiwpoint PV is high because the height of the motor vehicle of FIG. 6B is high. Thus, the optimum viewpoint setting that is suitable for the height of motor vehicle can be provided.

Figure 6C:
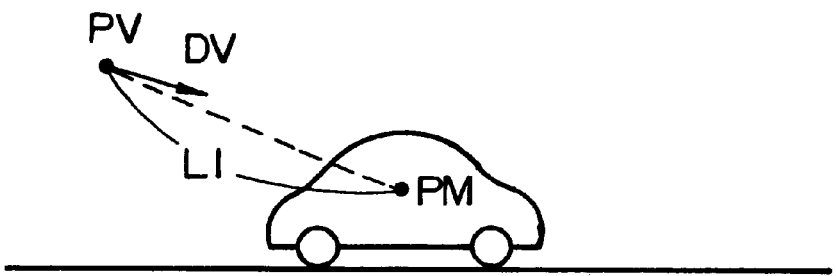
Figure 6D:
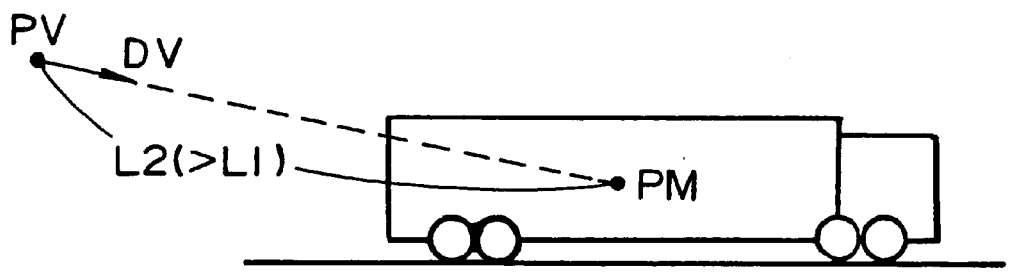

Second, the distance between the motor vehicle and the viewpoint is increased in proportion as the length of the motor vehicle is increased. As shown in FIGS. 6C and 6B, the distance L1 between the viewpoint PV and the motor vehicle PM of FIG. 6C is short because the length of the motor vehicle is short, and the distance L2 between the viewpoint PV and the motor vehicle PM of FIG. 6D is long because the length of the motor vehicle is long. Thus, the optimum viewpoint setting that is suitable for the length of motor vehicle can be provided.

Figure 7A:
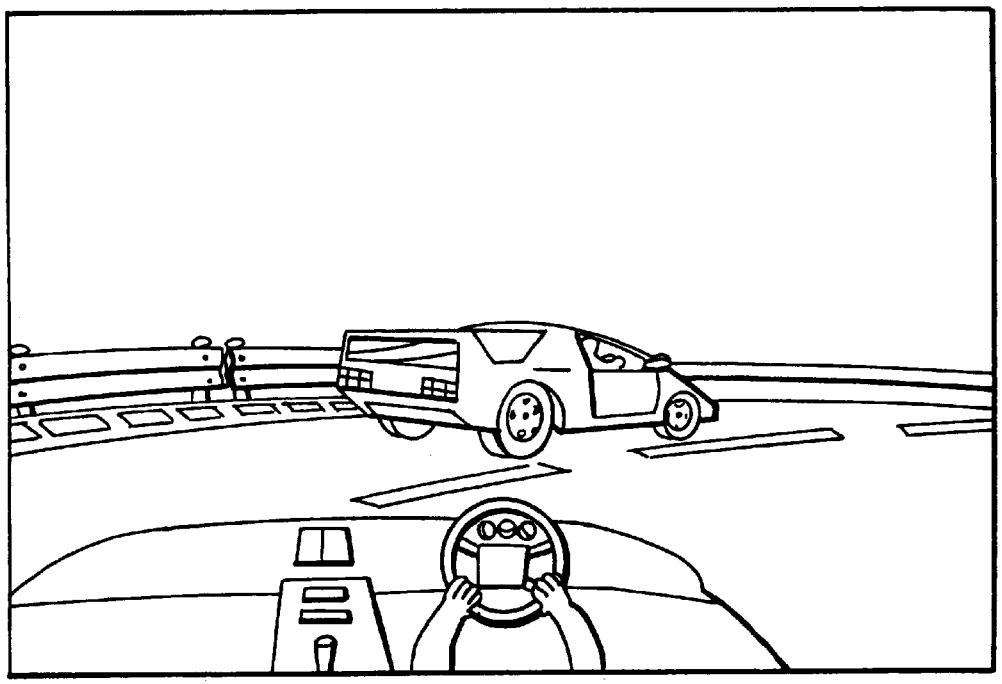
FIGS. 7A and 7B illustrate a method in which a different viewpoint position is applied depending on the position of a steering wheel in the selected moving body.

If the player selects a Japanese type motor vehicle (which has a right-hand steering wheel), for example, the viewpoint position is set at the driver's seat located in the right front. In this case, the player can be provided game images for driving a motor vehicle with a right-hand steering wheel, as shown in FIG. 7A.

Figure 7B:
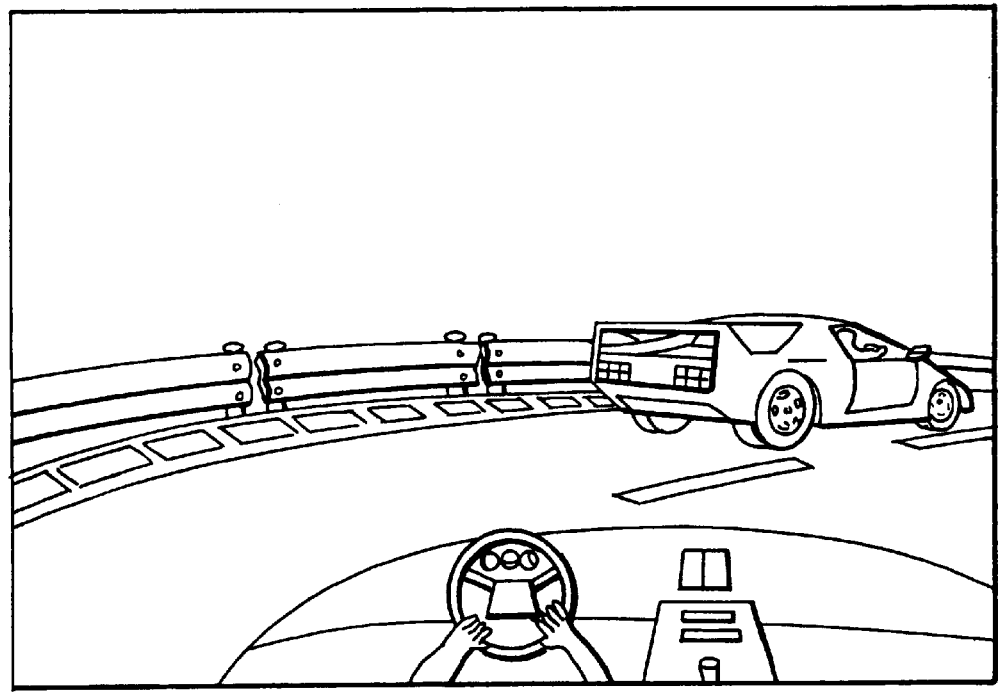

If the player selects a non-Japanese motor vehicle (which has a left-hand steering wheel), for example, the viewpoint position is set at the driver's seat located in the left front. In this case, the player can be provided game images for driving a motor vehicle with a left-hand steering wheel, as shown in FIG. 7B. Therefore, the player can feel as if he or she drives a motor vehicle with a left-hand steering wheel, further increasing the virtual reality.

According to this embodiment, the viewpoint setting may include setting of the angle of view, and the angle of view may be changed depending on the type of moving body.

Figure 8A:
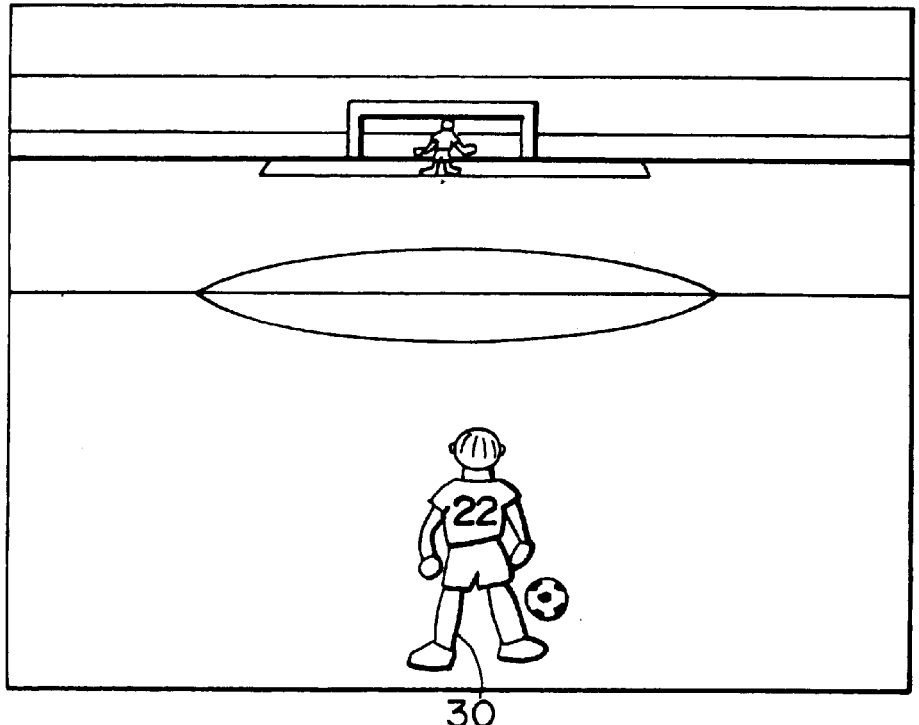
FIGS. 8A and 8B illustrate a method in which a different angle of view is applied depending on the type of selected moving body.
Figure 8B:
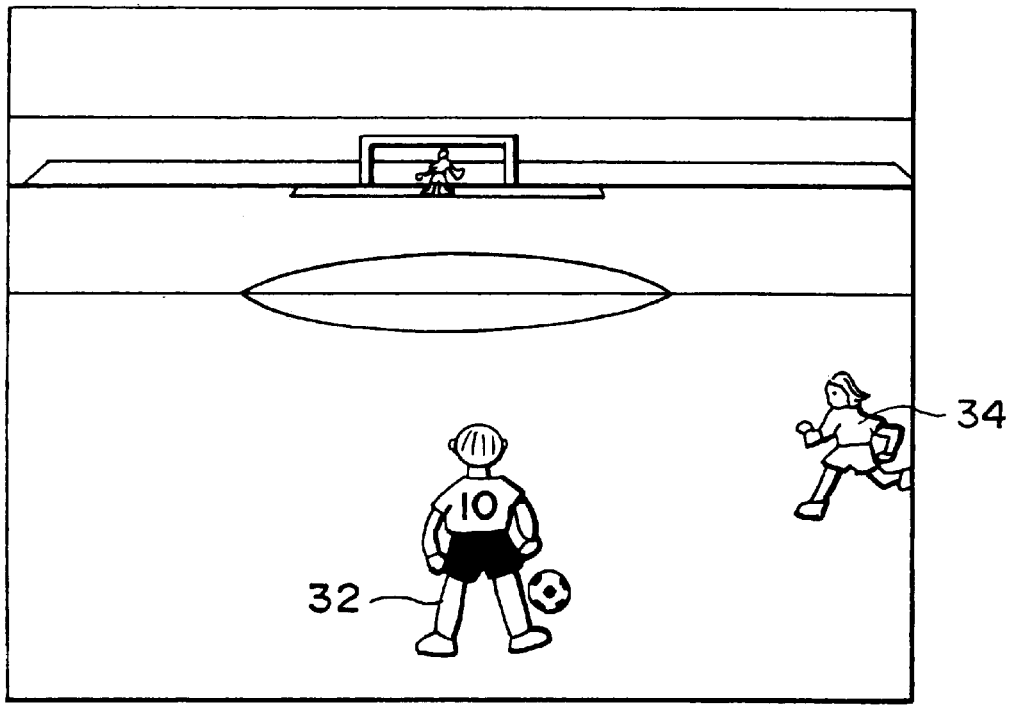

As shown in FIG. 8A, for example, if a player selects a character (moving body) 30 modeled on a soccer player having an average ability, the angle of view is reduced. On the other hand, as shown in FIG. 8B, if a player selects a character 32 modeled on a famous soccer player having a high ability, the angle of view is increased. When the angle of view is increased, the surrounding state can more easily be known to the player than the state of FIG. 8A. In such a case, an opponent character 34 is within the player's field of view. Thus, the player who selects the character 32 can play the game advantageously, so that the player can have an attachment to the player's character and feel enthusiasm for the game.

Further, the angle of view may be reduced for moving bodies frequently selected by advanced players, and may be increased for moving bodies frequently selected by beginners. Thus, the difficulty of the game can be controlled by changing the angle of view.

Figures 10A, 10B:
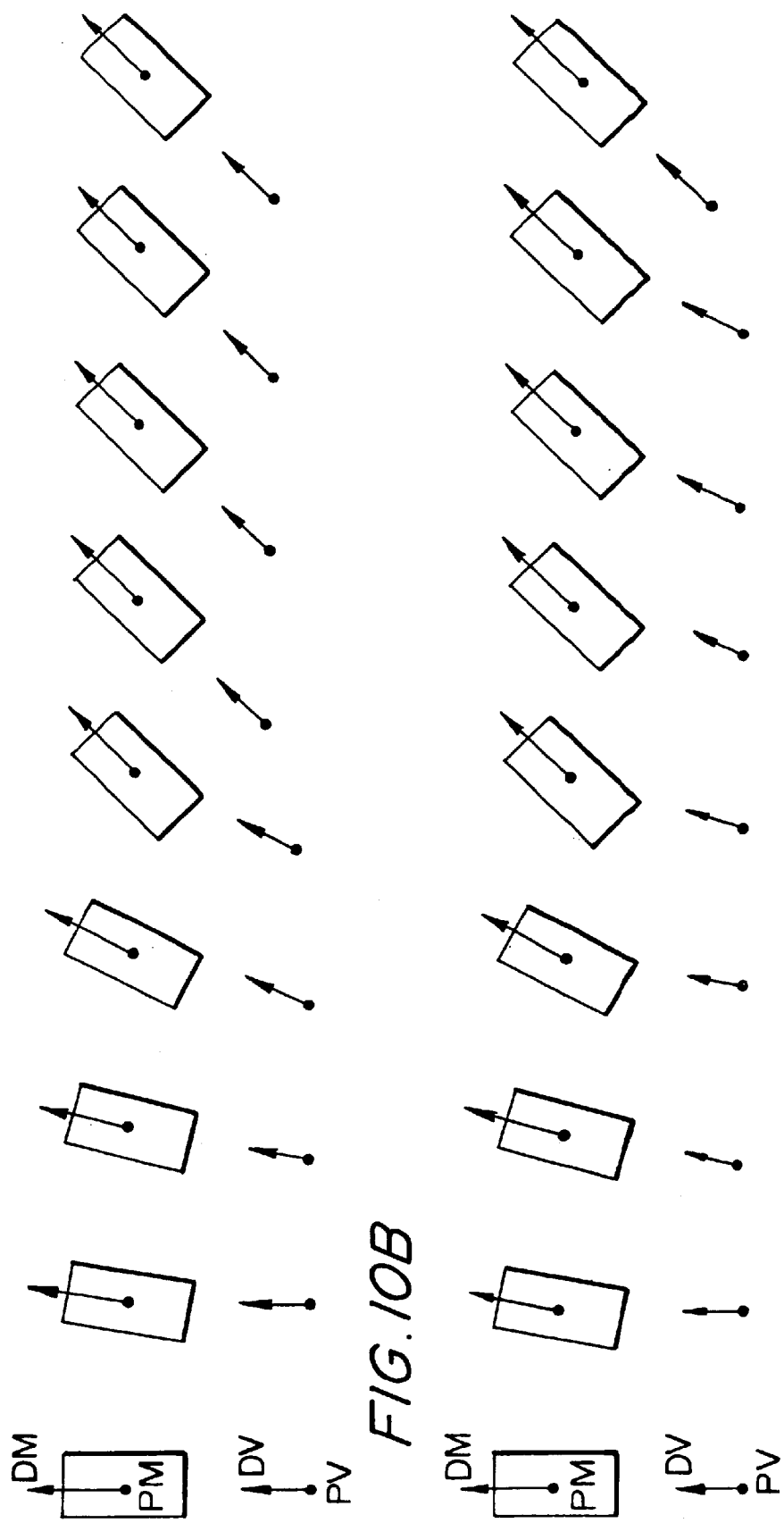
FIGS. 10A and 10B also illustrate a method in which a different spring constant is applied depending on the type of selected moving body.

Description below concerns an example where the moving body is followed by the viewpoint by the action of a "virtual spring" provided between the moving body and the viewpoint. As the spring constant of the virtual spring increases, the time delay in changing the viewpoint position PV or line-of-sight DV to follow the change of the position PM or direction DM of the moving body is reduced, as shown in FIGS. 9A and 10A. In other words, the responsiveness of the viewpoint in following the moving body is improved.

On the other hand, as the spring constant of the virtual spring decreases, the time delay in changing the viewpoint position PV or line-of-sight DV to follow the change of the position PM or direction DM is increased, as shown in FIGS. 9B and 10B. In other words, the responsiveness of the viewpoint in following the moving body is deteriorated.

Setting of the spring constant (or the responsiveness of the viewpoint for following the moving body) described above can be included in the viewpoint setting in this embodiment. In other words, the spring constant may be changed depending on the type of the moving body selected by the player.

For example, as the spring constant is increased to improve the following responsiveness (following degree) of the viewpoint, the blur in an image which occurs in accelerating or decelerating of the moving body is reduced. Thus, the difficulty of the game is reduced to provide a game image suitable for beginners. Therefore, for a motor vehicle that is frequently selected by beginners, the spring constant as a condition included in the viewpoint setting may be increased.

On the other hand, as the spring constant is decreased to deteriorate the following responsiveness (following degree) of the viewpoint, the blur in an image which occurs in accelerating or decelerating of the moving body is increased. Thus, the difficulty of the game is increased, but a realistic game image suitable for advanced players can be provided. Therefore, for a motor vehicle that is frequently selected by advanced players, the spring constant as a condition included in the viewpoint setting may be decreased.

In this embodiment, furthermore, a plurality of viewpoint control program are provided for a plurality of moving bodies. The viewpoint can be controlled according to a viewpoint control program that is changed depending on the type of selected moving body.

For example, if a player selects a first moving body, the viewpoint is controlled by a first viewpoint control program provided for the first moving body. According to the first viewpoint control program, the viewpoint position PV or line-of-sight DV is permitted (changed) to follow a slight change in the position PM or direction DM of the moving body, as shown in FIG. 11A.

On the other hand, if a player selects a second moving body, the viewpoint is controlled by a second viewpoint control program provided for the second moving body. According to the second viewpoint control program, the viewpoint position PV or line-of-sight DV is inhibited from following a slight change occurred in the position PM or direction DM of the moving body, as shown in FIG. 11B. For example, the height of the viewpoint PV is fixed and the line-of-sight DV is kept horizontal.

Figure 12A:
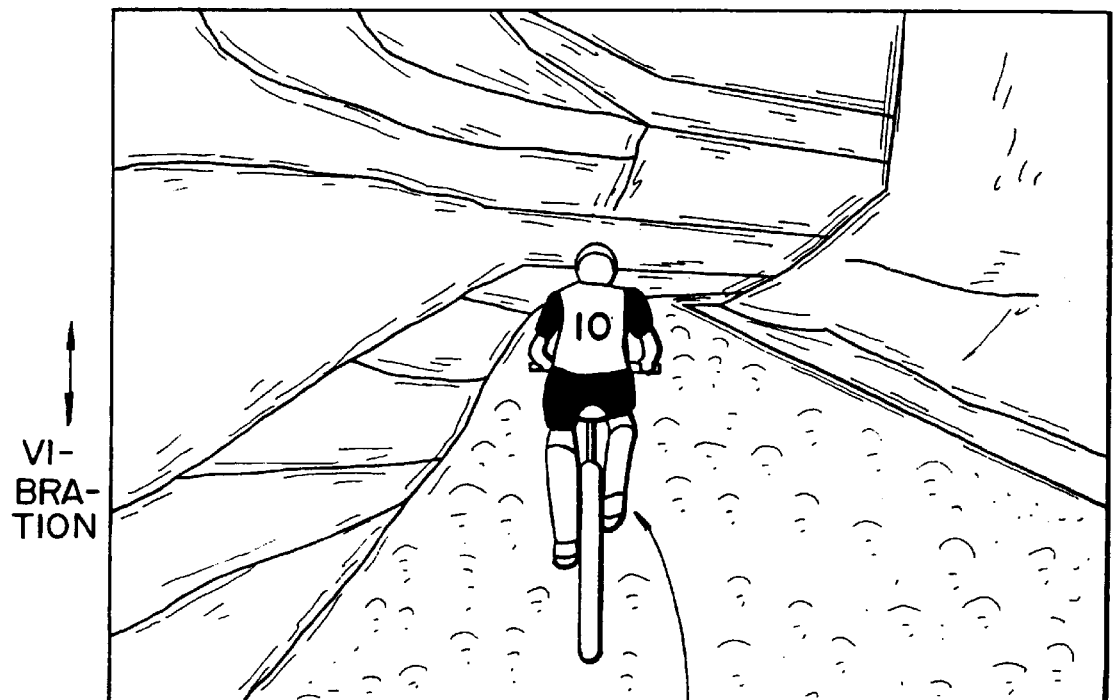
FIGS. 12A and 12B are examples of images generated according to the viewpoint control programs illustrated in FIGS. 11A and 11B.

The first viewpoint control program as shown in FIG. 11A can provide an image as shown in FIG. 12. In FIG. 12A, a moving body (comprising a bicycle and a character) 44 selected by the player is running on an irregular road. The background seems to be trembling due to slight vibration from the irregular road. In such a case, the moving body 40 itself does not seem to be trembling because the viewpoint is following the tremble of the moving body 40.

Figure 12B:
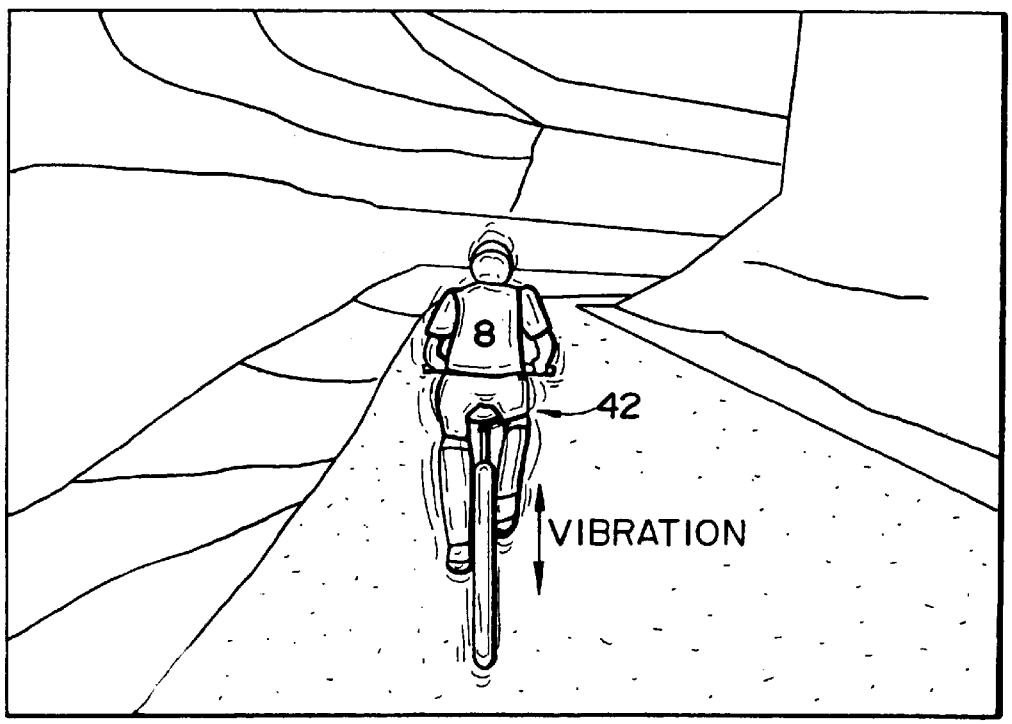

The second viewpoint control program as shown in FIG. 11B can provide an image as shown in FIG. 12B. In FIG. 12B, the moving body 42 seems to be trembling due to slight vibration from the irregular road. In such a case, the background does not seems to be trembling because the viewpoint is not following the tremble of the moving body 42.

In FIG. 12A, since the background seems to be trembling, the player may feel sick, but the image is very realistic. Therefore, the viewpoint for a motor vehicle that is frequently selected by advanced players may be controlled by the first viewpoint control program.

On the other hand, the image of FIG. 12B is not very realistic because only the moving body is trembling and the background is not trembling, but the player will not feel sick. Therefore, the viewpoint for a moving body that is frequently selected by beginners may be controlled by the second viewpoint control program.

An example of processings in this embodiment will now be described in detail with reference to the flowcharts of FIGS. 13 and 14.

The player first selects one motor vehicle from motor vehicles of types 1, 2 and 3 while viewing a selection image as shown in FIG. 3 (step S1). In this case, the type of the selected motor vehicle is denoted by N (=1, 2 or 3).

Then a viewpoint setting (which may include setting of viewpoint change pattern, viewpoint position, line-of-sight, angle of view, spring constant, viewpoint control program or the like) that is linked to (is suitable for) the type of the selected motor vehicle is read out from a given storage section of the image generation device, for example (step S2). The viewpoints in the viewpoint change pattern in this case are denoted by N-A and N-B.

A race is then started (step S3). A game computing process for determining the position and direction of the motor vehicle may be performed for each frame (step S4), for example. Subsequently, a viewpoint is controlled according to the viewpoint setting read out at the step S2 (step S5). An image viewed from this controlled viewpoint is then generated (step S6). The above sequence will be repeated until the race finishes (step S7).

Figure 13:
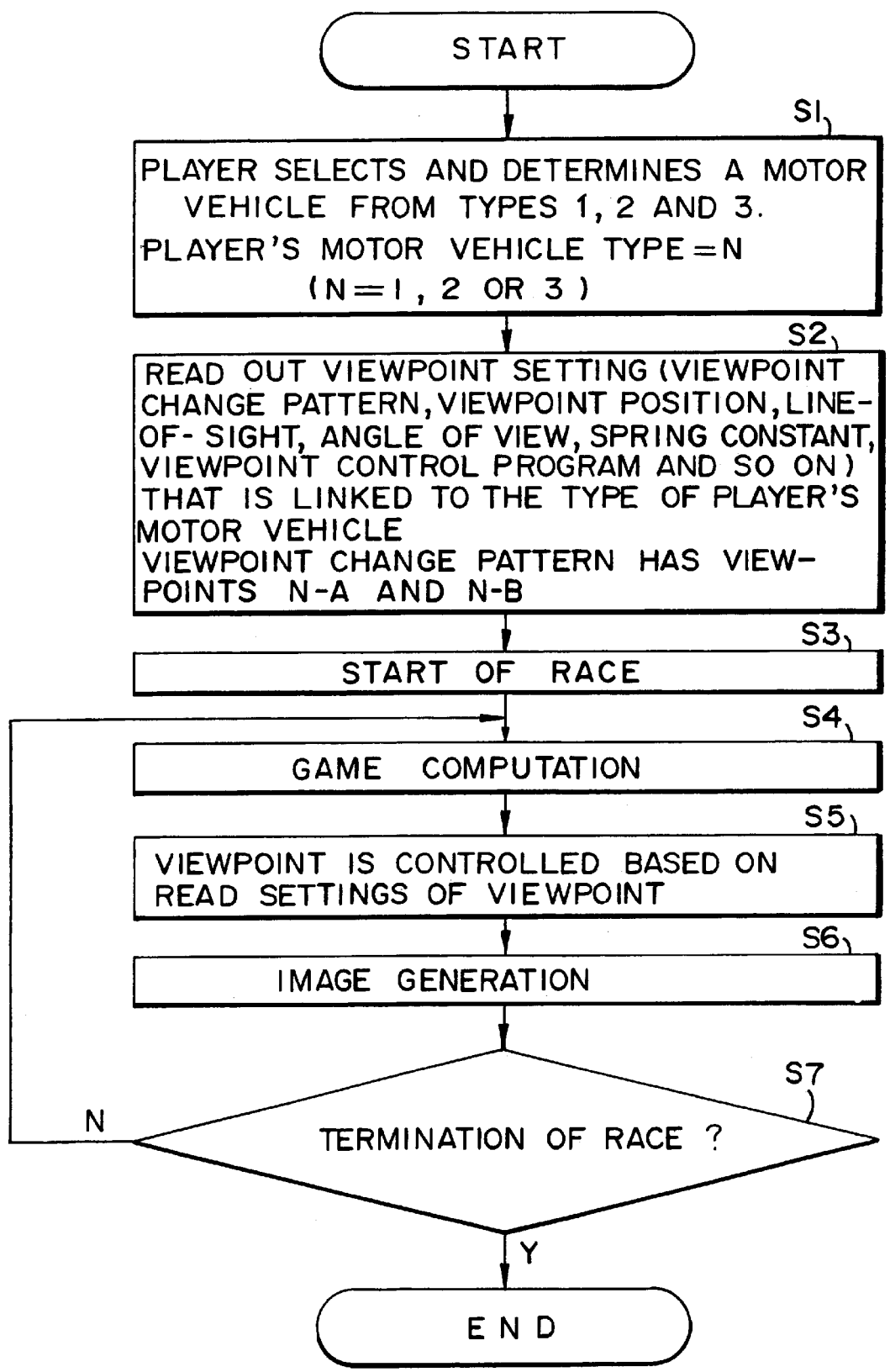
FIG. 13 is a flowchart for illustrating the details of proceedings in the embodiment of the present invention.
Figure 14:
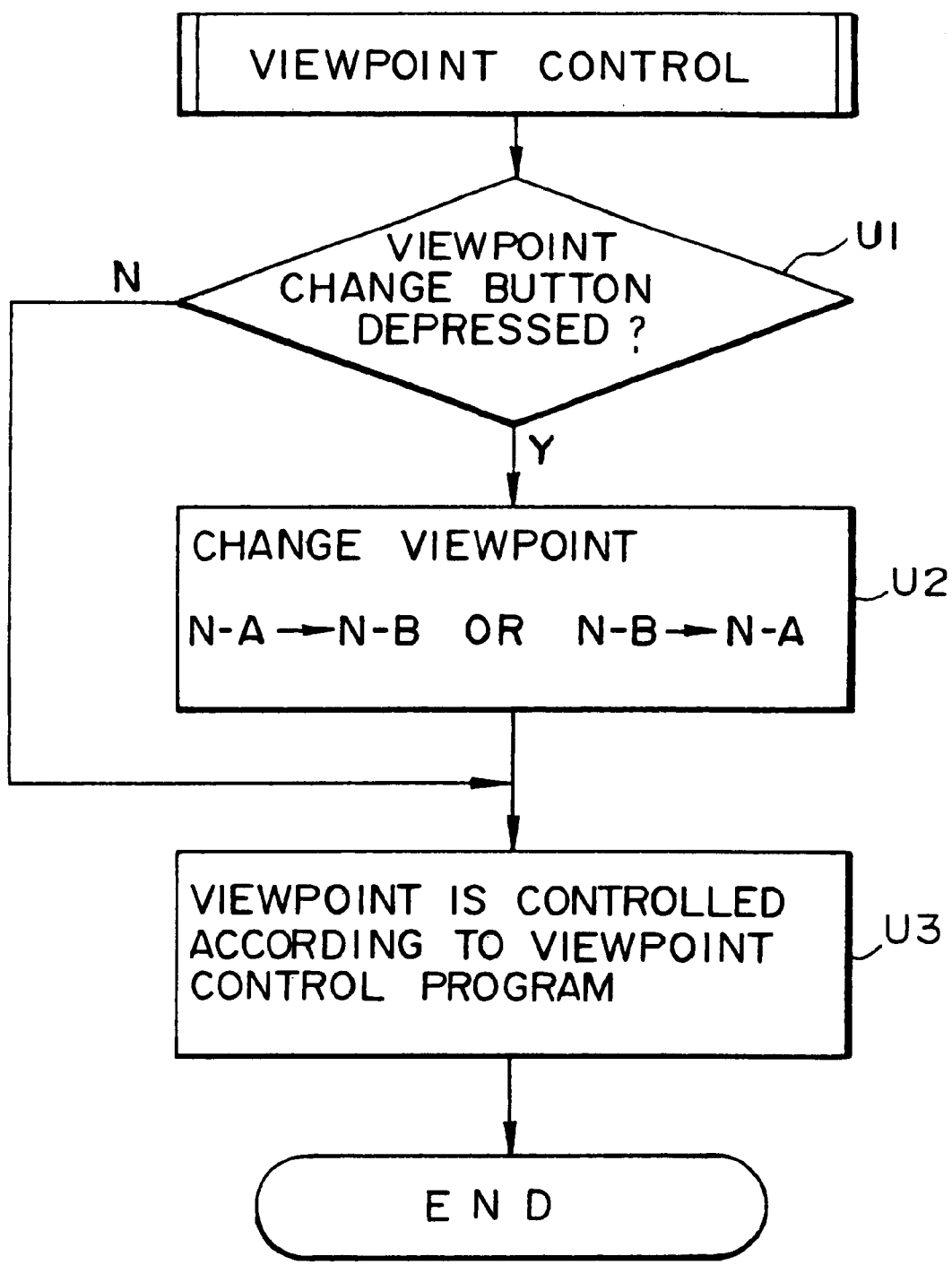
FIG. 14 is also a flowchart for illustrating the details of processing. in the embodiment of the present invention.

FIG. 14 is a flowchart illustrating an example of the viewpoint control process at the step S5 of FIG. 13. In this viewpoint control process, it is first determined whether or not the viewpoint change button 320 of FIG. 1 is depressed (step U1). If the button has been depressed, the viewpoint is changed from N-A to N-B or vice versa (step U2). Thus, the viewpoint can be changed depending on the type of motor vehicle as described in FIG. 4.

Subsequently, the viewpoint is controlled by a given viewpoint control program (step U3). In order to change the viewpoint control program depending on the type of motor vehicle, a viewpoint control program suitable for the selected motor vehicle is read out at the step S2 of FIG. 13. The viewpoint is controlled according to this viewpoint control program.

In this way, the optimum viewpoint that is suitable for the type of the moving body selected by the player can be set.

Figure 15:
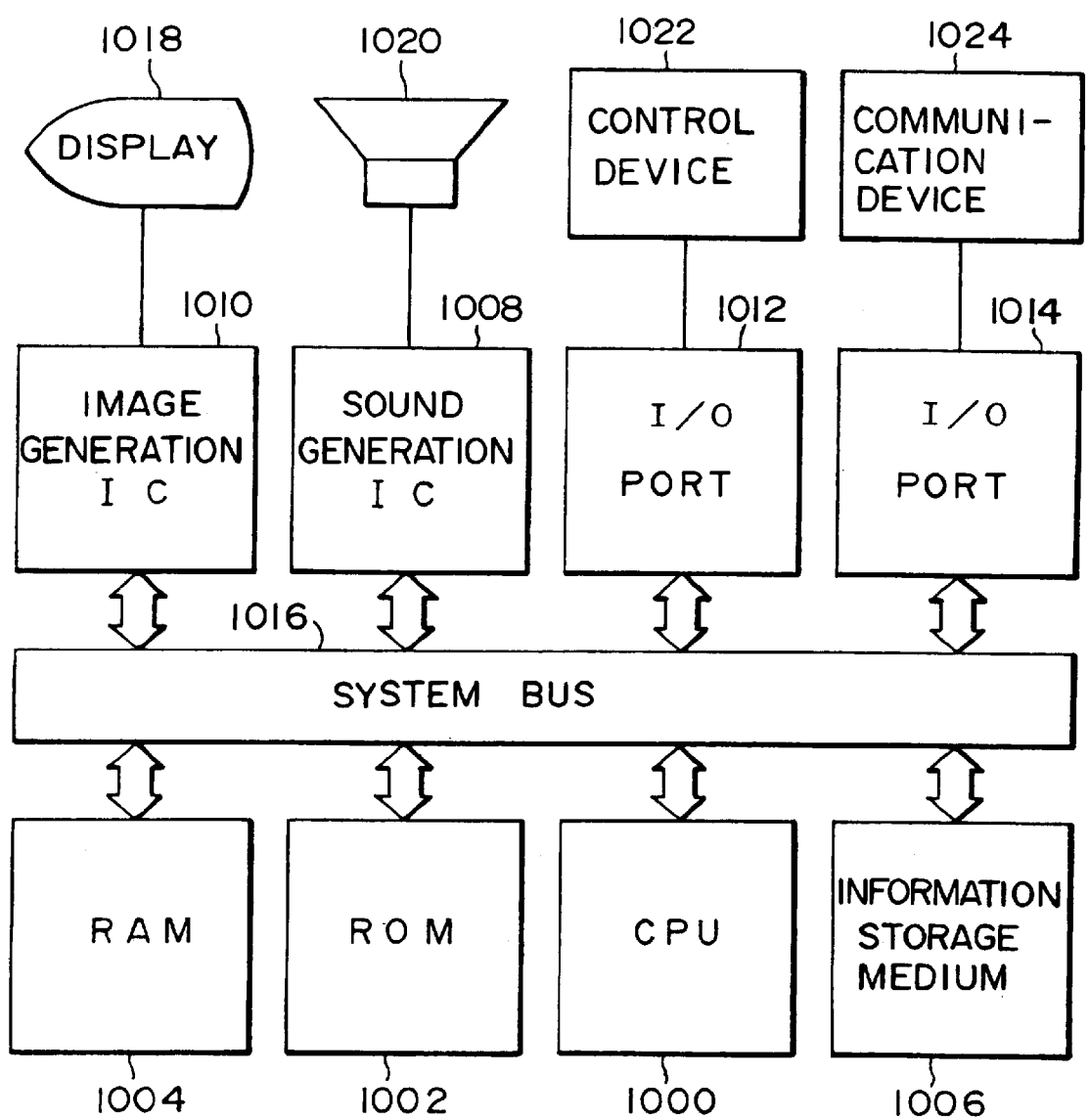
FIG. 15 illustrates a structure of an example of hardware which can realize the embodiment of the present invention.

A structure of hardware that can realize this embodiment of the present invention will be described with reference to FIG. 15. A system shown in this figure comprises CPU 1000, ROM 1002, RAN 1004, information storage medium 1006, sound generation IC 1009, image generation IC 1010 and I/O ports 1012 and 1014, all of which are interconnected by a system bus 1016 for data transmission therebetween. The image generation IC 1010 is connected to a display 1018; the sound generation IC 1008 is connected to a speaker 1020; the 110 port 1012 is connected to an operating section 1022; and the I/O port 1014 is connected to a communication device 1024.

The information storage medium 1006 stores a program and image and sound data for display objects. For example, in a domestic game device, information such as a game program is stored in an information storage medium such an a CD-ROM, game cassette, DVD or the like. In an arcade game device, the information storage medium may be in the form of memory such as ROM or the like. In the latter case, the information storage medium 1006 may be ROM 1002.

The operating section 1022 corresponds to a game controller, control panel or the like and is used to input the result of determination by the player into the system.

The CPU 1000 performs the control of the entire system and various data processing according to a program stored in the information storage medium 1006, a system program stored in the ROM 1002 (including information of initializing the system and other) and input signals from the operating section 1022. The RAM 1004 is a storage means used as a working area for the CPU 1000 and stores given contents in the information storage medium 1006 and ROM 1002 or the results of computation by the CPU 1000. A data structure having a logical architecture for realizing this embodiment will be constructed on this RAM or information storage medium.

The sound generation IC 1008 and the image generation IC 1010 can output preferred game sounds and images. The sound generation IC 1008 is an integrated circuit for generating game sounds such as sound effects or background music based on information in the information storage medium and ROM 1006, 1002. The generated game sounds are outputted through the speaker 1020. The image generation IC 1010 is an integrated circuit for generating pixel information to be outputted to the display 1018 based on the image information from the RAM 1004, the ROM 1002, the information storage medium 1006 or the like. The display 1018 may be replaced by a so-called head-mount display (HMD).

The communication device 1024 receives and delivers various information used by the game system from and to the external and can be connected to the other game system so that given information suitable for the game program will be received from and delivered to between the game systems or so that the game systems can receive and deliver the game program or the like through the communication line. Thus, a remote communication can be performed through the existing telephone line.

Various processings described in connection with FIGS. 1 to 12B can be accomplished by the information storage medium 1006 storing the programs for executing the processings shown in the flowcharts of FIGS. 13 and 14, the CPU 1000, image generation IC 1010, sound generation IC 1008 and others which are actuated according to the above programs. The processings performed by the image and sound generation IC's 1010, 1008 may be performed in a software manner through the CPU 1000 or all-purpose DSP, for example.

Repeatedly, FIG. 1 shows an arcade game apparatus to which this embodiment of the present invention is applied. In such a case, the CPU, image generation IC, sound generation IC and so on are mounted on a system board 1106 included in the apparatus. A memory 1108 that is an information storage medium on the system board 1106 stores information such as: information for selecting a player's moving body from a plurality of moving bodies; information for selecting a viewpoint setting suitable for the selected moving body from a plurality of settings provided for the moving bodies to control the viewpoint according to the selected viewpoint setting; information for generating an image viewed from the viewpoint controlled by the selected viewpoint setting; information for changing the viewpoint based on a viewpoint change pattern that is changed depending on the type of selected moving body. These informations will be referred to "stored information". The stored information includes at least one of a program code for performing the various processings mentioned above, the image information, the sound information, information of object shapes, table data, list data, player information and so on.

Figure 16A:
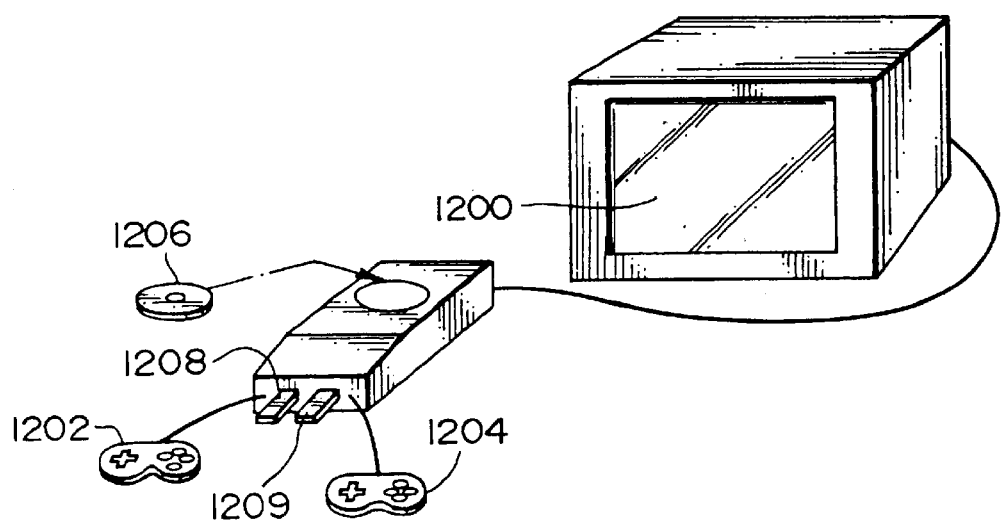
FIGS. 16A and 16B illustrate various forms of devices to which the embodiment of the present invention can be applied.

FIG. 16A shows a domestic game device to which the present invention is applied. A player enjoys the game by actuating game controllers 1202 and 1204 while viewing a game image displayed on a display 1200. In this case, the stored information is stored in CD-ROM 1206 and IC cards 1208, 1209 which are information storage media detachably inserted into the device.

Figure 16B:
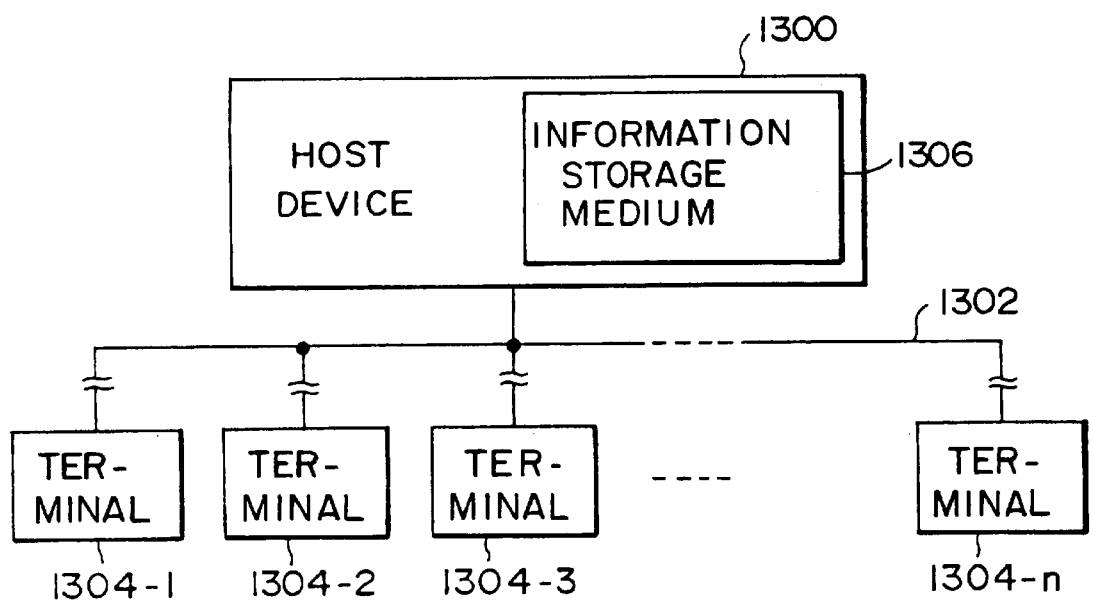

FIG. 16B shows a game machine to which the present invention is applied, comprising a host machine 1300 and terminals 1304-1 to 1304-n connected to the host machine 1300 by communications lines 1302. In this case, the above-described stored information is stored in an information storage medium 1306 such as a magnetic disk, magnetic tape, or memory that can be controlled by the host machine 1300. Each of the terminals 1304-1 to 1304-n has a CPU, an image generation IC, and a sound generation IC. In addition, if game image. and sounds can be generated thereby in a stand-alone manner, game programs and others for generating game images and sounds are transferred to the terminals 1304-1 to 1304-n from the host machine 1300. On the other hand, if they cannot be generated in a stand-alone manner, the host machine 1300 creates the game images and sounds and then transfers them to the terminals 1304-1 to 1304-n for output by those terminals.

It is to be noted that this invention is not limited to the above described embodiments, but can be implemented in various other ways.

For example, the veiwpoint setting may include various other conditions than those of the illustrated embodiment if it is in the scope of the invention and if it can be changed depending on the type of selected moving body. For example, the viewpoint control program that is changed depending on the type of selected moving body is not limited to those described in connection with FIGS. 11A and 11B.

The present invention is not limited to the games described with reference to this embodiment, but may similarly be applied to any of various other games such as competing games, sports games, fighting games, roll-playing games, shooting games and so on.

The present invention is not limited to the domestic and arcade game machines, but may similarly be applied to an image generation device used in various other apparatuses such as simulators, large-scale and multi-player attraction systems, personal computers, multimedia terminals, system boards for generating game images and so on.

What is claimed is:

1. An image generation device for generating an image viewed from a given viewpoint in an object space, comprising:
    means for selecting a moving body operated by a player from a plurality of moving bodies;
    means for selecting a viewpoint setting that is linked to the selected moving body from a plurality of viewpoint settings provided for the plurality of moving bodies and for controlling the viewpoint based on the selected viewpoint setting; and
    means for generating an image viewed from the viewpoint that is controlled based on the selected viewpoint setting;
    wherein said viewpoint setting includes setting of the angle of view and the angle of view is changed depending on the selecting moving body; and
    wherein the angle of view is increased when a moving body having high ability is selected.

2. The image generation device as defined in claim 1,
    wherein said viewpoint setting includes setting of a viewpoint change pattern;
    wherein a viewpoint change pattern that is linked to the selected moving body is selected from a plurality of viewpoint change patterns provided for said plurality of moving bodies; and
    wherein the viewpoint is changed according to the selected viewpoint change pattern.

3. The image generation device as defined in claim 2,
    wherein the viewpoint setting includes setting of a viewpoint control program;

wherein a viewpoint control program that is linked to the selected moving body is selected from a plurality of viewpoint control program provided for the plurality of moving bodies; and wherein the viewpoint is controlled according to the selected viewpoint control program.

4. The image generation device as defined in claim 3, wherein a first viewpoint control program for the first moving body among the plurality of moving bodies permits the viewpoint position or line-of-sight to follow the slight change in the position or direction of the first moving body; and wherein a second viewpoint control program for the second moving body among the plurality of moving bodies inhibits the viewpoint position or line-of-sight frame following the slight change in the position or direction of the second moving body.

5. The image generation device as defined in claim 1, wherein the viewpoint setting includes setting of a viewpoint control program;

wherein a viewpoint control program that is linked to the selected moving body is selected from a plurality of viewpoint control programs provided for the plurality of moving bodies; and wherein the viewpoint is controlled according to the selected viewpoint control program.

6. The image generation device as defined in claim 5, wherein a first viewpoint control program for the first moving body among the plurality of moving bodies permits the viewpoint position or line-of-sight to follow the slight change in the position or direction of the first moving body; and wherein a second viewpoint control program for the second moving body among the plurality of moving bodies inhibits the viewpoint position or line-of-sight from following the slight change in the position or direction of the second moving body.

7. An image generation device for generating an image viewed from a given viewpoint in an object space, comprising:

means for selecting a moving body operated by a player from a plurality of moving bodies;

means for selecting a viewpoint setting that is linked to the selected moving body from a plurality of viewpoint settings provided for the plurality of moving bodies and for controlling the viewpoint based on the selected viewpoint setting; and means for generating an image viewed from the viewpoint that is controlled based on the selected viewpoint setting;

wherein said viewpoint setting includes setting of the angle of view and the angle of view is changed depending on the selected moving body; and wherein the angle of view is reduced when an advanced player selects the moving body and the angle of view is increased when a beginner player selects the moving body.

8. The image generation device as defined in claim 7, wherein the height of the viewpoint is increased in proportion as the height of the moving body is increased.

9. The image generation device as defined in claim 7, wherein the distance between the moving body and the viewpoint is increased in proportion as the length of the moving body is increased.

10. The image generation device as defined in claim 7, wherein the viewpoint setting includes setting of a viewpoint control program;

wherein a viewpoint control program that is linked to the selected moving body is selected from a plurality of viewpoint control programs provided for the plurality of moving bodies; and wherein the viewpoint is controlled according to the selected viewpoint control program.

11. An image generation device for generating an image viewed from a given viewpoint in an object space, comprising:

means for selecting a moving body operated by a player from a plurality of moving bodies;

means for selecting a viewpoint setting that is linked to the selected moving body from a plurality of viewpoint settings provided for the plurality of moving bodies and for controlling the viewpoint based on the selected viewpoint setting; and means for generating an image viewed from the viewpoint that is controlled based on the selected viewpoint setting;

wherein said viewpoint setting includes setting of the responsiveness of the viewpoint in following the moving body and the following responsiveness of the viewpoint is changed depending on the selected moving body; and wherein the following responsiveness of the viewpoint is reduced when advanced player selects the moving body and the following responsiveness of the viewpoint is increased when a beginner player selects the moving body.

12. An image generation device for generating an image viewed from a given viewpoint in an object space, comprising:

means for selecting a moving body operated by a player from a plurality of moving bodies;

means for selecting a viewpoint setting that is linked to the selected moving body from a plurality of viewpoint settings provided for the plurality of moving bodies and for controlling the viewpoint based on the selected viewpoint setting; and means for generating an image viewed from the viewpoint that is controlled based on the selected viewpoint setting;

wherein said viewpoint setting includes setting of the viewpoint position;

wherein a first moving body among the plurality of the moving bodies has a viewpoint in the right front of the first moving body; and wherein a second moving body among the plurality of the moving bodies has a viewpoint in the left front of the second moving body.

13. An image generation device for generating an image viewed from a given viewpoint in an object space, comprising:

means for selecting a moving body operated by a player from a plurality of moving bodies;

means for selecting a viewpoint setting that is linked to the selected moving body from a plurality of viewpoint settings provided for the plurality of moving bodies and for controlling the viewpoint based on the selected viewpoint setting; and means for generating an image viewed from the viewpoint that is controlled based on the selected viewpoint setting;

wherein the viewpoint setting includes setting of a viewpoint control program;

wherein a viewpoint control program that is linked to the selected moving body is selected from a plurality of viewpoint control programs provided for the plurality of moving bodies;

wherein the viewpoint is controlled according to the selected viewpoint control program;

wherein a first viewpoint control program for the first moving body among the plurality of moving bodies permits the viewpoint position or line-of-sight to follow the slight change in the position or direction of the first moving body; and wherein a second viewpoint control program for the second moving body among the plurality of moving bodies inhibits the viewpoint position or line-of-sight from following the slight change in the position or direction of the second moving body.

14. A computer-usable information storage medium for including information to generate an image viewed from a given viewpoint in an object space, comprising:

information for selecting a moving body operated by a player from a plurality of moving bodies;

information for selecting a viewpoint setting that is linked to the selected moving body from a plurality of viewpoint settings provided for the plurality of moving bodies and for controlling the viewpoint based on the selected viewpoint setting; and information for generating an image viewed from the viewpoint that is controlled based on the selected viewpoint setting;

wherein said viewpoint setting includes setting of the angle of view and the angle of view is changed depending on the selected moving body; and wherein the angle of view is increased when a moving body having high ability is selected.

15. The information storage medium as defined in claim 14, wherein said viewpoint setting includes setting of a viewpoint change pattern;

wherein a viewpoint change pattern that is linked to the selected moving body is selected from a plurality of viewpoint change patterns provided for said plurality of moving bodies; and wherein the viewpoint is changed according to the selected viewpoint change pattern.

16. The information storage medium as defined in claim 15, wherein the viewpoint setting includes setting of a viewpoint control program;

wherein a viewpoint control program that is linked to the selected moving body is selected from a plurality of viewpoint control programs provided for the plurality of moving bodies; and wherein the viewpoint is controlled according to the selected viewpoint control program.

17. The information storage medium as defined in claim 16, wherein a first viewpoint control program for the first moving body among the plurality of moving bodies permits the viewpoint position or line-of-light to follow the slight change in the position or direction of the first moving body; and wherein a second viewpoint control program for the second moving body among the plurality of moving bodies inhibits the viewpoint position or line-of-sight from following the slight change in the position or direction of the second moving body.

18. The information storage medium as defined in claim 14, wherein the viewpoint setting includes setting of a viewpoint control program;

wherein a viewpoint control program that is linked to the selected moving body is selected from a plurality of viewpoint control programs provided for the plurality of moving bodies; and wherein the viewpoint is controlled according to the selected viewpoint control program.

19. The information storage medium as defined in claim 18, wherein a first viewpoint control program for the first moving body among the plurality of moving bodies premits the viewpoint position or line-of-sight to follow the slight change in the position or direction of the first moving body; and wherein a second viewpoint control program for the second moving body among the plurality of moving bodies inhibits the viewpoint position or line-of-sight from following the slight change in the position or direction of the second moving body.

20. A computer-usable information storage medium for including information to generate an image viewed from a given viewpoint in an object space, comprising:

information for selecting a moving body operated by a player from a plurality of moving bodies;

information for selecting a viewpoint setting that is linked to the selected moving body from a plurality of viewpoint settings provided for the plurality of moving bodies and for controlling the viewpoint based on the selected viewpoint setting; and information for generating an image viewed from the viewpoint that is controlled based on the selected viewpoint setting;

wherein said viewpoint setting includes setting of the angle of view and the angle of view is changed depending on the selected moving body; and wherein the angle of view is reduced when an advanced player selects the moving body and the angle of view is increased when a beginner player selects the moving body.

21. The information storage medium as defined in claim 20, wherein the height of the viewpoint is increased in proportion as the height of the moving body is increased.

22. The information storage medium as defined in claim 20, wherein the distance bets the moving body and the viewpoint is increased in proportion as the length of the moving body is increased.

23. The information storage medium as defined in claim 20, wherein the viewpoint setting includes setting of a viewpoint control program;

wherein a viewpoint control program that in linked to the selected moving body in selected from a plurality of viewpoint control programs provided for the plurality of moving bodies; and wherein the viewpoint is controlled according to the selected viewpoint control program.

24. A computer-usable information storage medium for including information to generate an image viewed from a given viewpoint in an object space, comprising:

information for selecting a moving body operated by a player from a plurality of moving bodies;

information for selecting a viewpoint setting that is linked to the selected moving body from a plurality of viewpoint settings provided for the plurality of moving bodies and for controlling the viewpoint based on the selected viewpoint setting; and information for generating an image viewed from the viewpoint that is controlled based on the selected viewpoint setting;

wherein said viewpoint setting includes setting of the responsiveness of the viewpoint in following the moving body and the following responsiveness of the viewpoint is changed depending on the selected moving body; and wherein the following responsiveness of the viewpoint is reduced when an advanced player selects the moving body and the following responsiveness of the viewpoint is increased when a beginner player selects the moving body.

25. A computer-usable information storage medium for including information to generate an image viewed from a given viewpoint in an object space, comprising:

information for selecting a moving body operated by a player from a plurality of moving bodies;

information for selecting a viewpoint setting that is linked to the selected moving body from a plurality of viewpoint settings provided for the plurality of moving bodies and for controlling the viewpoint based on the selected viewpoint setting; and information for generating an image viewed from the viewpoint that is controlled based on the selected viewpoint setting;

wherein said viewpoint setting includes setting of the viewpoint position;

wherein a first moving body among the plurality of the moving bodies has a viewpoint in the right front of the first moving body; and wherein a second moving body among the plurality of the moving bodies has a viewpoint in the left front of the second moving body.

26. A computer-usable information storage medium for including information to generate an image viewed from a given viewpoint in an object space, comprising:

information for selecting a moving body operated by a player from a plurality of moving bodies;

information for selecting a viewpoint setting that is linked to the selected moving body from a plurality of viewpoint settings provided for the plurality of moving bodies and for controlling the viewpoint based on the selected viewpoint setting; and information for generating an image viewed from the viewpoint that is controlled based on the selected viewpoint setting;

wherein the viewpoint setting includes setting of a viewpoint control program;

wherein a viewpoint control program that is linked to the selected moving body is selected from a plurality of viewpoint control programs provided for the plurality of moving bodies;

wherein the viewpoint is controlled according to the selected viewpoint control program;

wherein a first viewpoint control program for the first moving body among the plurality of moving bodies permits the viewpoint position or line-of-sight to follow the slight change in the position or direction of the first moving body; and wherein a second viewpoint control program for the second moving body among the plurality of moving bodies inhibits the viewpoint position or line-of-sight from following the slight change in the position or direction of the second moving body.

27. An image generation method for generating an image viewed from a given viewpoint in an object space, comprising:

selecting a moving body operated by a player from a plurality of moving bodies;

selecting a viewpoint setting that is linked to the selected moving body from a plurality of viewpoint settings provided for the plurality of moving bodies and controlling the viewpoint based on the selected viewpoint setting; and generating an image viewed from the viewpoint that is controlled based on the selected viewpoint setting;

wherein said viewpoint setting includes setting of the angle of view and the angle of view is changed depending on the selected moving body; and wherein the angle of view is increased when a moving body having high ability is selected.

28. An image generation method for generating an image viewed from a given viewpoint in an object space, comprising:

selecting a moving body operated by a player from a plurality of moving bodies;

selecting a viewpoint setting that is linked to the selected moving body from a plurality of viewpoint settings provided for the plurality of moving bodies and controlling the viewpoint based on the selected viewpoint setting; and generating an image viewed from the viewpoint that is controlled based on the selected viewpoint setting;

wherein said viewpoint setting includes setting of the angle of view and the angle of view is changed depending on the selected moving body; and wherein the angle of view is reduced when an advanced player selects the moving body and the angle of view is increased when a beginner player selects the moving body.

29. An image generation method for generating an image viewed from a given viewpoint in an object space, comprising:

selecting a moving body operated by a player from a plurality of moving bodies;

selecting a viewpoint setting that is linked to the selected moving body from a plurality of viewpoint settings provided for the plurality of moving bodies and controlling the viewpoint based on the selected viewpoint setting; and generating an image viewed from the viewpoint that is controlled based on the selected viewpoint setting;

wherein said viewpoint setting includes setting of the responsiveness of the viewpoint in following the moving body and the following responsiveness of the viewpoint is changed depending on the selected moving body; and wherein the following responsiveness of the viewpoint is reduced when an advanced player selects the moving body and the following responsiveness of the viewpoint is increased when a beginner player selects the moving body.

30. An image generation method for generating an image viewed from a given viewpoint in an object space, comprising:

selecting a moving body operated by a player from a plurality of moving bodies;

selecting a viewpoint setting that is linked to the selected moving body from a plurality of viewpoint settings provided for the plurality of moving bodies and controlling the viewpoint based on the selected viewpoint setting; and generating an image viewed from the viewpoint that is controlled based on the selected viewpoint setting;

wherein said viewpoint setting includes setting of the viewpoint position;

wherein a first moving body among the plurality of the moving bodies has a viewpoint in the right front of the first moving body; and wherein a second moving body among the plurality of the moving bodies has a viewpoint in the left front of the second moving body.

31. An image generation method for generating an image viewed from a given viewpoint in an object space, comprising:

selecting a moving body operated by a player from a plurality of moving bodies;

selecting a viewpoint setting that is linked to the selected moving body from a plurality of viewpoint settings provided for the plurality of moving bodies and controlling the viewpoint based on the selected viewpoint setting; and generating an image viewed from the viewpoint that is controlled based on the selected viewpoint setting;

wherein the viewpoint setting includes setting of a viewpoint control program;

wherein a viewpoint control program that is linked to the selected moving body is selected from a plurality of viewpoint control programs provided for the plurality of moving bodies;

wherein the viewpoint is controlled according to the selected viewpoint control program;

wherein a first viewpoint control program for the first moving body among the plurality of moving bodies permits the viewpoint position or line-of-sight to follow a slight change in the position or direction of the first moving body; and wherein a second viewpoint control program for the second moving body among the plurality of moving bodies inhibits the viewpoint position or line-of-sight from following a slight change in the position or direction of the second moving body.

* * * * *